April 9, 1935.  W. A. LOCKHART  1,997,561
LENS CUTTING MACHINE
Filed Aug. 19, 1932  8 Sheets-Sheet 1
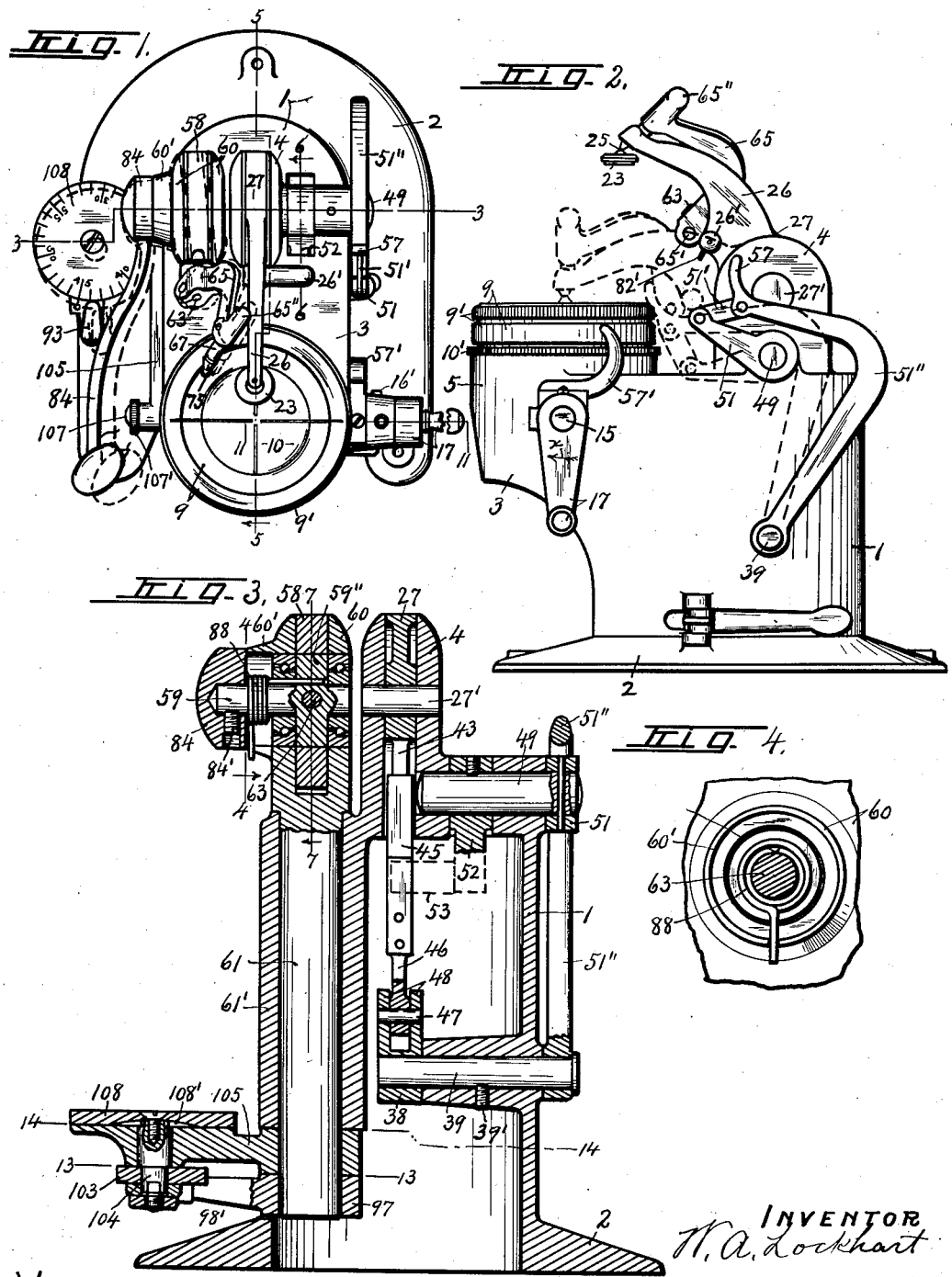

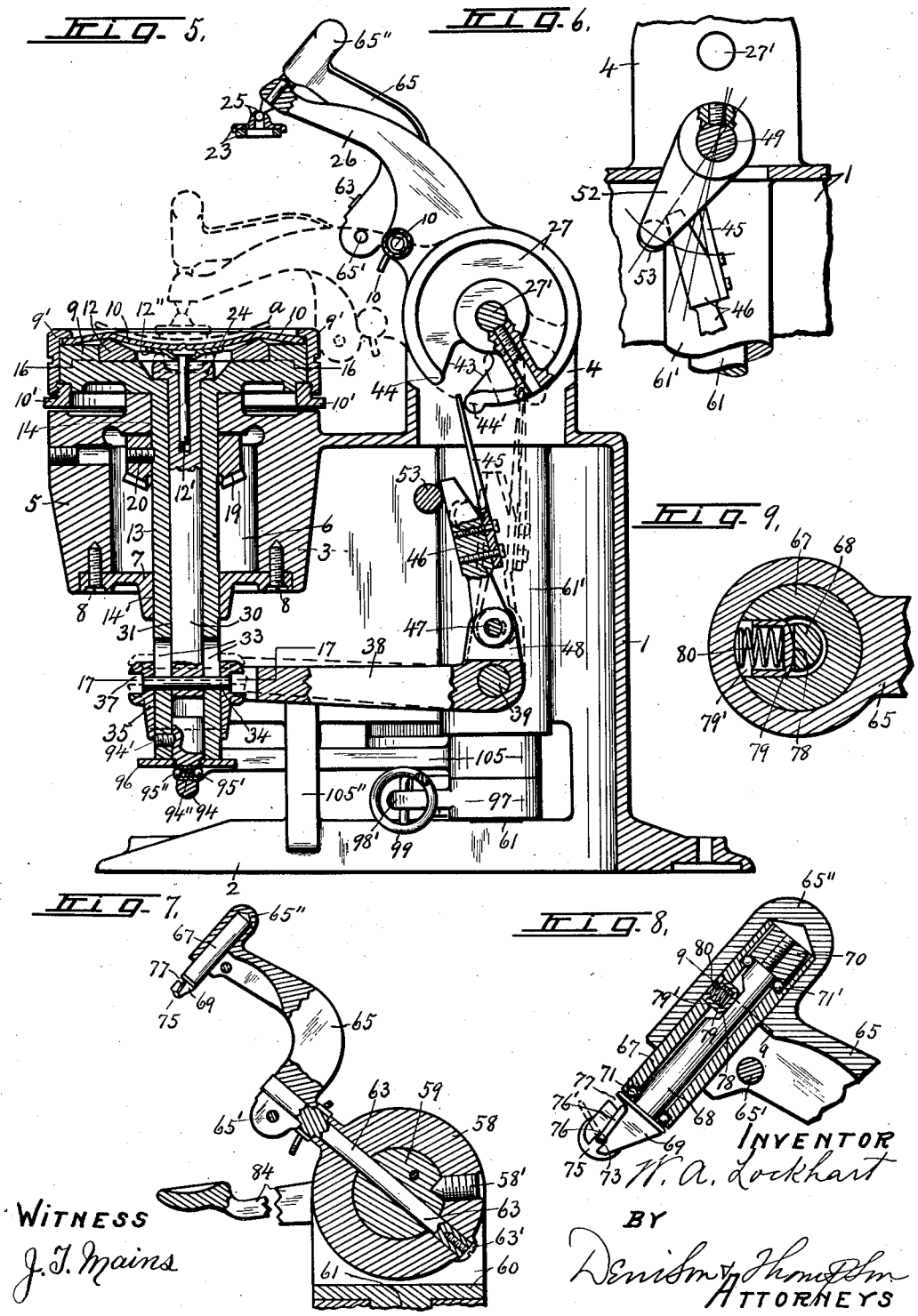

April 9, 1935.  W. A. LOCKHART  1,997,561
LENS CUTTING MACHINE
Filed Aug. 19, 1932   8 Sheets-Sheet 3
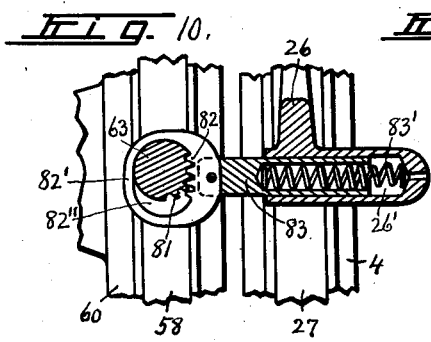
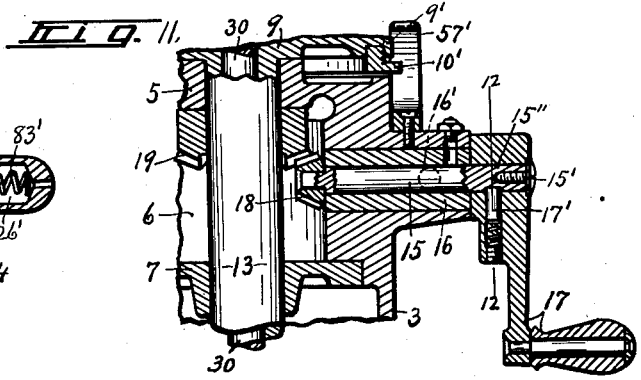
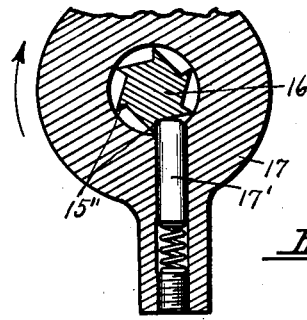
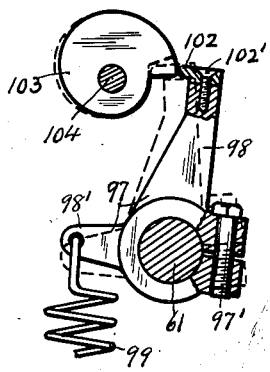
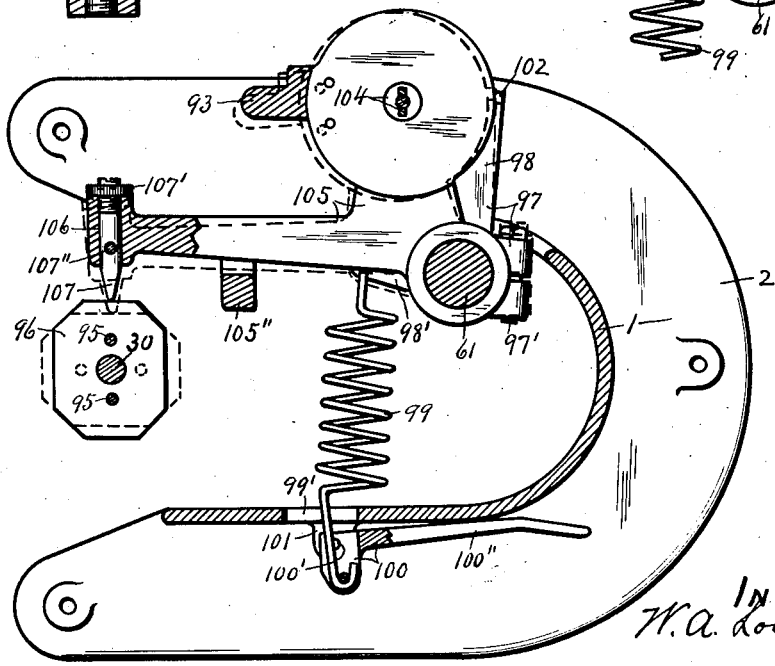

April 9, 1935. W. A. LOCKHART 1,997,561
LENS CUTTING MACHINE
Filed Aug. 19, 1932 8 Sheets—Sheet 4
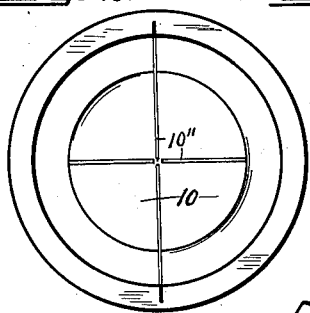
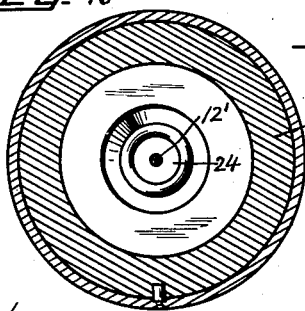
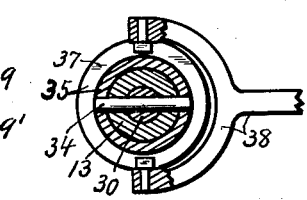
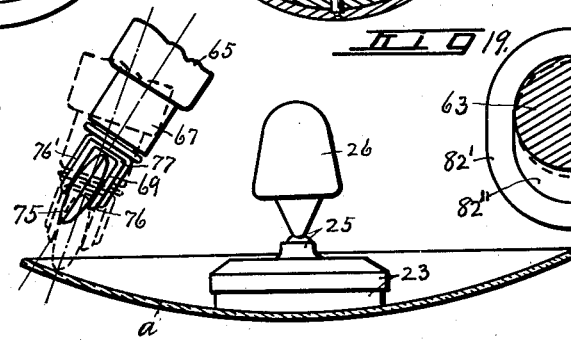
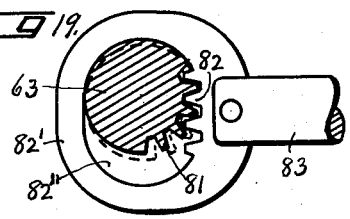
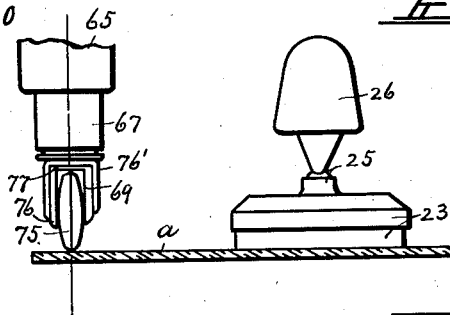
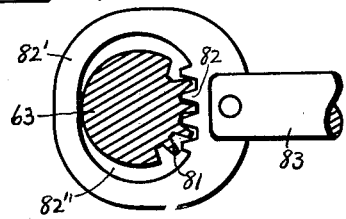
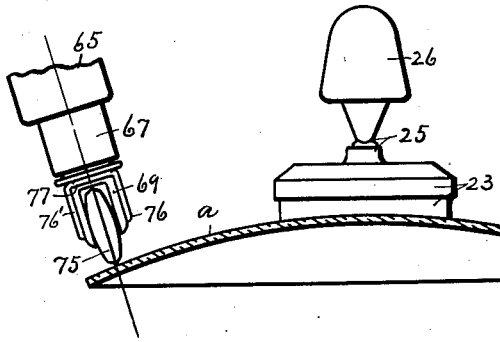
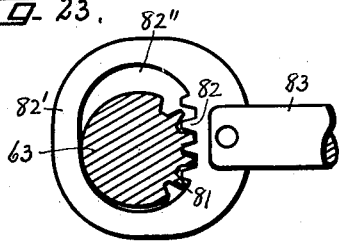
INVENTOR
W. A. Lockhart
BY
Denison & Thompson
ATTORNEYS
WITNESS
J. J. Mains

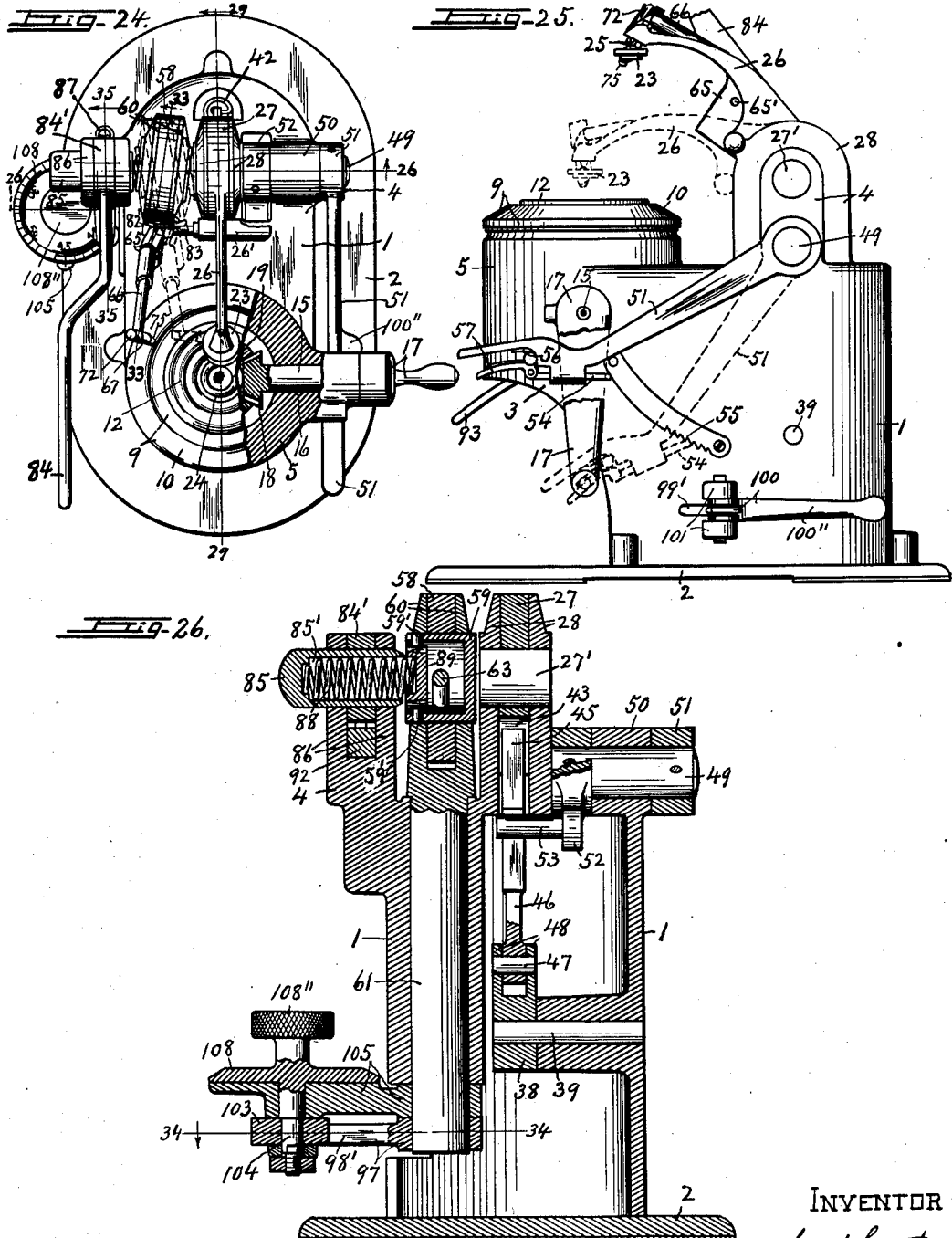

April 9, 1935. W. A. LOCKHART 1,997,561
LENS CUTTING MACHINE
Filed Aug. 19, 1932 8 Sheets-Sheet 6
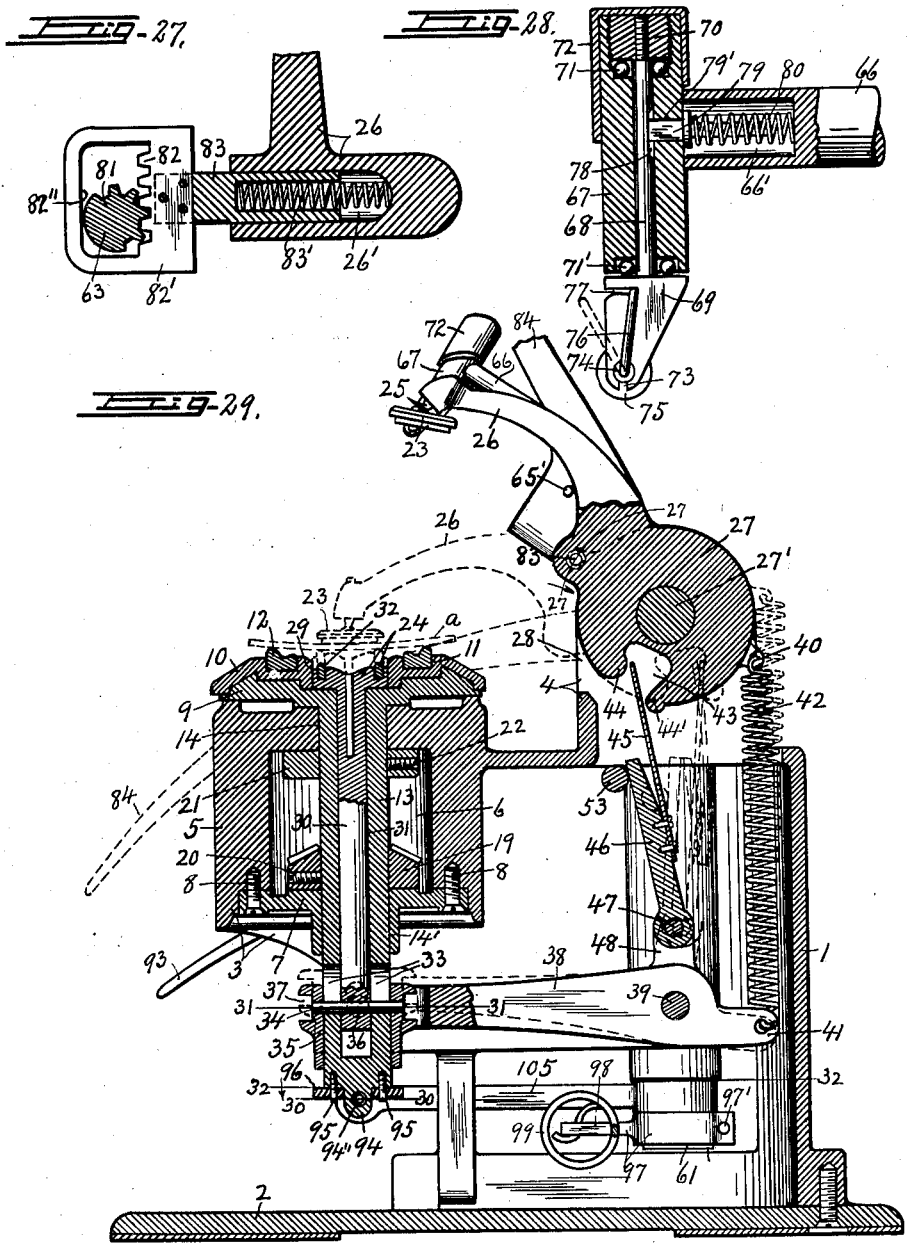
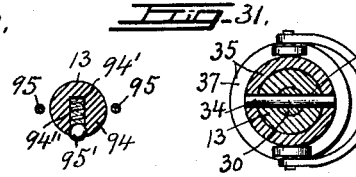

April 9, 1935.  W. A. LOCKHART  1,997,561
LENS CUTTING MACHINE
Filed Aug. 19, 1932   8 Sheets-Sheet 7
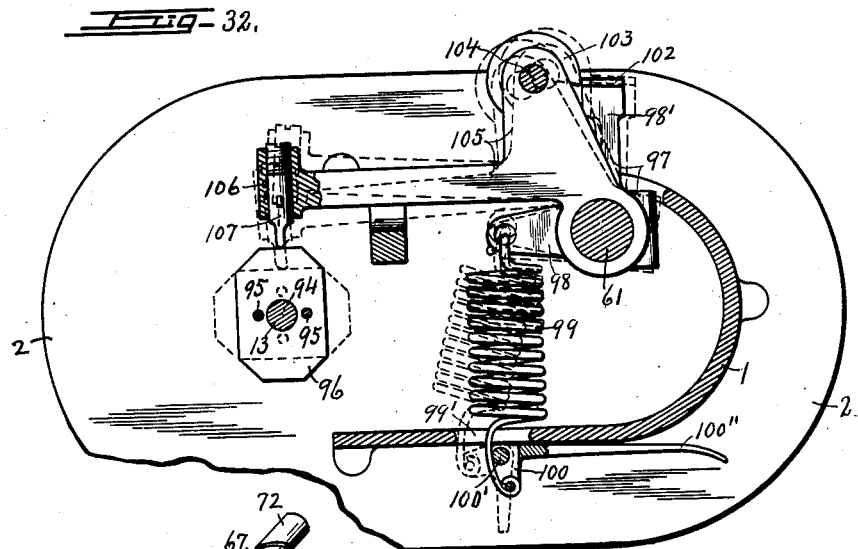
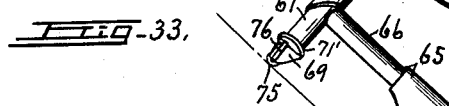
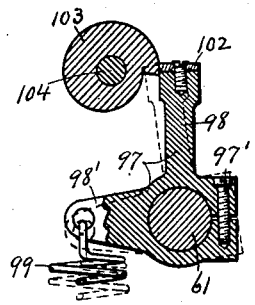
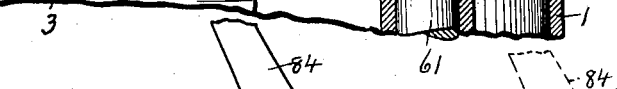
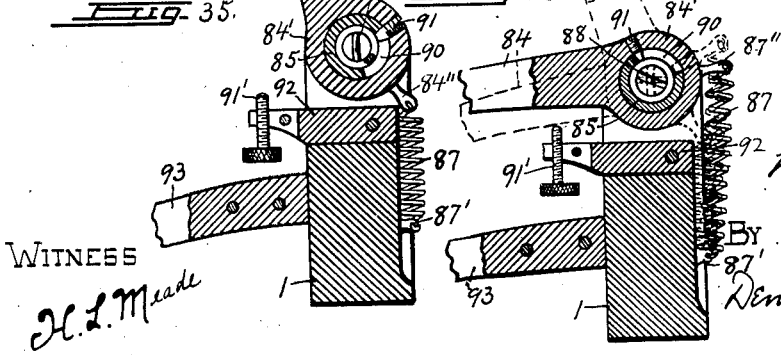

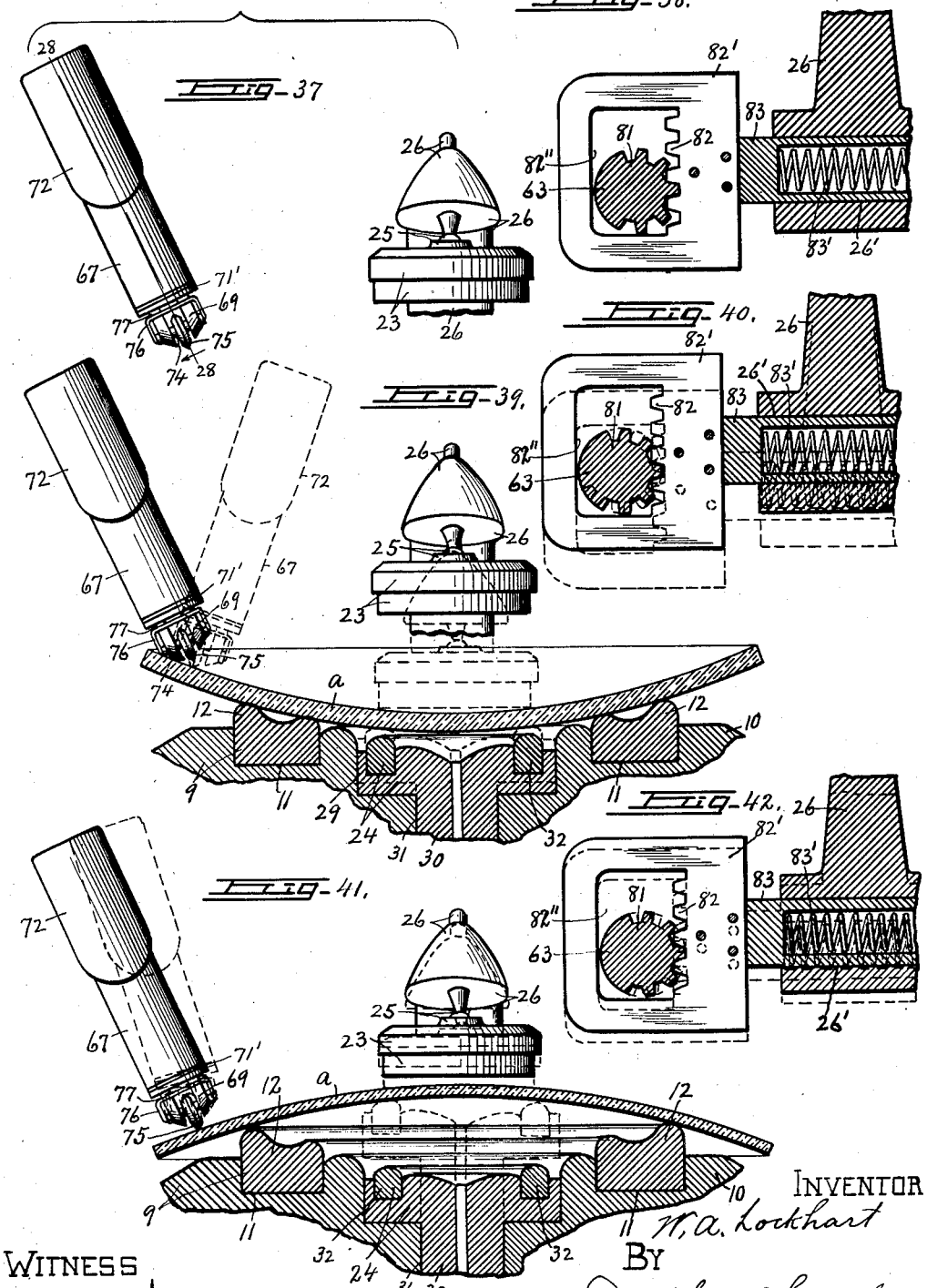

Patented Apr. 9, 1935

1,997,561

UNITED STATES PATENT OFFICE 1,997,561

LENS CUTTING MACHINE

William A. Lockhart, Geneva, N. Y., assignor to Shuron Optical Company, Inc., Geneva, N. Y., a corporation Application August 19, 1932, Serial No. 629,475

50 Claims. (Cl. 33—28)

This invention relates to a machine for cutting lenses or other glass objects of any regular or irregular perimetral contour and refers more particularly to that type of machine in which the work-holder is rotatable at will about a vertical axis, in combination with a lens cutter which is movable at will into and out of engagement with the work, together with pattern-controlled means for automatically moving the cutting tool toward and from the axis of rotation of the work for cutting the latter to conform to the contour of the pattern, and additional means for adjusting the cutter to cut lenses to different sizes.

It is well-known that the surface contours and thicknesses of different portions of the lens blanks to be cut are widely variable and one of the objects of the present invention is to provide means whereby the cutter spindle will automatically assume an angle substantially normal to the surface operated upon before or upon the engagement of the cutter with said surface.

Another object is to mount the cutter eccentrically to the axis of an upright rotatable supporting spindle so that it will automatically assume a position substantially tangential to the portion of the rotating lens engaged thereby.

Owing to these widely varying surface contours and thicknesses of the lenses and the characteristic fragility thereof, it has been found to be advisable to provide cooperative clamping devices substantially co-axial with the axis of rotation of the work table and operable at will for engaging opposite faces of the central portion of the lens to support the same during the cutting operation and one of the objects of the present invention is to provide means whereby the movement of one of the clamping devices into engagement with the lens will automatically bring the other clamping member to its clamping position under yielding pressure and to regulate these movements so that the second clamping member will be brought into action only after the first member has been brought into contact with the lens.

In other words, I have sought to provide simple and efficient means whereby both clamping members may be brought into holding engagement with the lens under relatively light yielding pressure to reduce the liability of breaking the lens or allowing it to slip on the work table during the cutting operation.

The main object, however, is to increase the output and general efficiency of machines of this character and at the same time to enable the same machine to be used for cutting lenses with angular or widely varying perimetral contours as well as those with regularly curved edges.

Other objects and uses relating to specific parts of the machine will be brought out in the following description.

In the drawings:—

Figure 1 is a top plan, partly in section, of a lens cutting machine embodying the various features of my invention, as preferred.

Figure 2 is a side elevation of the same machine, the upper lens clamping arm and cutter supporting arm together with the operating lever therefor being shown by dotted lines as moved to their operative positions.

Figure 3 is an enlarged vertical sectional view taken in the plane of line 3—3, Figure 1.

Figure 4 is an enlarged detail sectional view taken on line 4—4, Figure 3.

Figure 5 is an enlarged vertical sectional view taken in the plane of line 5—5, Figure 1, the dotted lines indicating the clamping position of the lense clamping means.

Figure 6 is an enlarged vertical sectional view taken in the plane of line 6—6, Figure 1.

Figure 7 is an enlarged detail vertical sectional view taken on line 7—7, Figure 3.

Figure 8 is an enlarged sectional view of the cutter supporting members, shown in Figure 7.

Figure 9 is an enlarged detail sectional view taken on line 9—9, Figure 8.

Figure 10 is an enlarged detail vertical sectional view taken on line 10—10, Figure 5.

Figure 11 is an enlarged detail vertical sectional view taken in the plane of line 11—11, Figure 1.

Figure 12 is an enlarged detail vertical sectional view taken on line 12—12, Figure 11.

Figure 13 is a horizontal sectional view taken on line 13—13, Figure 3.

Figure 14 is an enlarged horizontal sectional view taken on line 14—14, Figure 3.

Figure 15 is a top plan of the detached work-supporting pad for the rotary work table.

Figures 16 and 17 are horizontal sectional views taken respectively on lines 16—16 and 17—17, Figure 5.

Figure 18 is an enlarged front face view of portions of the upper lens clamp and cutter adapted to engage the concave face of a lens, the dotted lines indicating the position assumed by the cutter when engaging the work.

Figure 19 is an enlarged front face view partly in section of the rack and pinion in their normal relation before the cutter engages the work, the dotted lines indicating the position assumed by the pinion when the cutter engages the work.

Figures 20 and 22 are front end face views similar to Figure 18 adapted to operate upon a plane surface and a convex surface respectively.

Figures 21 and 23 are views similar to Figure 19 showing the relative positions assumed by the rack and pinion when the cutter is engaged with the surfaces shown in Figures 20 and 22 respectively.

Figure 24 is a top plan, partly in section, of a lens cutting machine embodying modified features of my invention.

Figure 25 is a side elevation of the modified machine shown in Figure 24 in which a portion of the hand crank for operating the rotary work support is broken away, the lens clamping arm and cutter supporting arm together with the operating lever therefore, being shown by dotted lines as moved toward their operative positions.

Figure 26 is an enlarged vertical sectional view taken in the plane of line 26—26, Figure 24.

Figure 27 is a detail sectional view taken on line 27—27, Figure 29.

Figure 28 is an enlarged detail sectional view taken in the plane of line 28—28, Figure 37.

Figure 29 is an enlarged vertical sectional view taken in the plane of line 29—29, Figure 24.

Figures 30 and 31 are detail horizontal sectional views taken respectively on lines 30—30 and 31—31 Figure 29.

Figure 32 is a horizontal sectional view taken on line 32—32, Figure 29.

Figure 33 is an enlarged detail vertical sectional view taken on line 33—33, Figure 24, the work-supporting table and adjacent portions of its supporting bracket being shown in elevation.

Figure 34 is a detail horizontal sectional view taken in the plane of line 34—34, Figure 26.

Figure 35 is an enlarged detail vertical sectional view taken on line 35—35, Figure 24, portions of the pressure controlling handles for the cutter being broken away.

Figure 36 is a sectional view similar to Figure 35, in which the pressure lever is shown in a position ready to yieldingly press the cutter against the work.

Figure 37 is an enlarged front face view of the cutter support and upper lens clamping member in their normal up positions.

Figure 38 is an enlarged vertical sectional view similar to Figure 27 showing the rack and pinion in their normal positions when the cutter support and upper clamping member are in their normally elevated positions as shown in Figure 37.

Figure 39 is a front face view of the cutter support and upper lens clamping member and an enlarged sectional view through the upper portion of the work-supporting table with a lens thereon, the lens clamping member being shown by dotted lines in its clamping position while the cutter support is also shown by dotted lines as tilted to its operative position with the cutter normal to the surface of the lens engaged thereby.

Figure 40 is a sectional view similar to Figure 38 in which the rack is shown by dotted lines as moved to the position for effecting the tilting movement of the cutter support shown in Figure 39.

Figure 41 is an enlarged front face view of the cutter support and upper ends clamping member similar to that shown in Figures 37 and 38, together with an enlarged sectional view of the upper portion of the work supporting table and a lens thereon having its convex face uppermost, the clamping member being shown by dotted lines as engaged with the lens while the cutter support is shown by dotted lines in position for adjusting the cutter normal to the convex surface of the lens.

Figure 42 is an enlarged sectional view similar to Figures 38 and 40 showing the rack and pinion by dotted lines in position for effecting the tilting movement of the cutter support.

As illustrated, this machine comprises a hollow upright main supporting frame 1 adapted to be mounted upon a bench or other support in a manner most convenient for the operator for receiving and supporting a rotary work holder and its operating means, a lens clamping mechanism; a lens cutting mechanism including means for automatically adjusting the cutter normal to the surface of the work engaged thereby, and pressure-applying means together with pattern-controlled means for shifting the cutter toward and from the axis of the work-holder to cause the lens to be cut to the exact form of the pattern including means adjustable at will for setting the cutter at different distances from the axis of the work holder and thereby varying the size of the lens irrespective of the size of the pattern.

The hollow upright frame 1 is preferably open at the bottom and is provided with a substantially U-shaped base 2 open at the front to permit convenient access to the interior parts for adjustments or replacements, the upper portions of the frame being extended forwardly at 3 over the opposite arms of the base and provided with an upwardly projecting bifurcated bracket 4 for receiving and supporting the upper arm of the lens clamping means presently described.

The upper front portion or bracket 3 of the frame is provided with a hollow substantially cylindrical upright gear case 5 having an inner chamber 6 for receiving and supporting a rotary work carrier and certain parts of the driving means therefor, the lower end of the gear case being provided with a removable section 7 forming the bottom of the chamber 6 and held in place by bolts 8 which when removed permit the interior parts to be removed or replaced, see Figure 5.

*Work-carrier*

The means for supporting the lens or other work as *a* comprises a circular rotary table 9 journaled in and upon the gear case 5 co-axial therewith and carrying upon its upper face a co-axial relatively thin circular disk or diaphragm 10 of rubber or equivalent flexible and resilient material for direct engagement with the underside of the work to rotate with the table and also to assist in transmitting rotary motion to the work, see Figure 5.

The disk 10 is firmly clamped to the upper face of the table 9 by releasable means consisting in this instance of a clamping ring 9' and a nut 10', said ring being extended entirely around the periphery of the table and having its upper end provided with an inturned flange engaging the upper face of the marginal edge of the disk and its lower end threaded and engaged by the nut 10' which, when tightened, engages the lower end of the table for holding the ring in its clamping position.

The upper side of the table 9 is provided with a concentric annular recess in which is seated a rubber or equivalent resilient annulus 12 which projects slightly above the surface of the table for yieldingly supporting the adjacent portions of the disk to further reduce the liability of breaking the lens when the upper clamping member is applied thereto in a manner presently described.

The upper surface of the disk 10 is provided with radial lines or indicia 10'' arranged at right angles to each other to represent the axes of the pattern and lens so that when the disk is placed in proper position upon the table to bring its radial lines in vertical alinement with the corresponding axes of the pattern, the lens to be cut bearing similarly arranged indicia, may be placed upon the disk in proper relation to the pattern ready to be cut.

The work-table 9 is provided with a co-axial tubular hub 13 extending downwardly therefrom through suitable journal bearings 14 and 14' in the upper and lower ends of the gear case 5 to enable the table to rotate in a horizontal plane about a vertical axis, see Figures 5 and 11.

Driving means for the work-table

The means for rotating the work table 9 comprises a relatively short horizontal shaft 15 journaled in a suitable bearing sleeve 16 in one side, in this instance the right hand side, of the gear case 5 radial to the hub of the table 9 and having its outer end adapted to receive and support a one-way drive hand-crank 17 which is held against accidental endwise displacement by a cap screw 15', Figure 11.

That is, the hand-crank 17 is loosely mounted on the outer end of the shaft 15 and is provided with a pawl 17' which is spring pressed into engagement with ratchet teeth 15'' on the shaft 15 for transmitting motion to said shaft when the hand-crank is rotated in a clock-wise direction indicated by arrow x, Figure 2, but trails freely over the teeth when the hand-crank is rotated in the opposite direction, see Figures 11 and 12.

The inner end of the shaft 15 is provided with a bevel pinion 18 meshing with the underside of a bevel gear 19 which latter is secured by a set screw 20 or equivalent fastening means to the upright hub or shaft 13 of the work table 9 within the gear case 5 to rotate said table in a counter clockwise direction and is adapted to engage the lower face of the top wall of said gear case to hold the table against upward movement as shown more clearly in Figures 5 and 11.

It is now clear that the work table 9 and parts carried thereby can be rotated by the hand-crank 17 in one direction only by reason of the pawl and ratchet connection between said hand-crank and shaft 15, the object of which is to prevent marring of the lens by the cutter in case the hand-crank should be turned backward while the cutter is engaged with the lens.

It will be noted that the pinion 18 on the inner end of the shaft 15 is of slightly less diameter than and engages the inner end of the sleeve 16 to hold said shaft against endwise displacement, said sleeve being secured to the gear case by a set screw 16' which, when loosened permits the sleeve with the shaft and pinion thereon to be removed endwise if desired, see Figures 1 and 11.

Work clamping means

Suitable means is provided for holding the work against the upper surface of the yielding disk or pad 10 under yielding pressure sufficient to cause the work to rotate with the table without liability of slipping or breakage and for this purpose is provided upper and lower clamping heads 23 and 24 operatively arranged in opposed relation co-axial with the axis of the shaft 13 and table 9 for sequential operation in a manner presently described, see Figure 5.

The upper clamping member 23 is connected by a ball and socket joint 25 to one end of a supporting arm 26 to rotate relatively thereto, said arm having its rear end provided with a hub 27 which is journaled through the medium of a shaft 27' upon and between opposite arms of the bifurcated upright bracket 4 previously mentioned.

The object of the swivel connection between the upper clamping head 23 and front end of the arm 26 is to permit said head to rotate with the lens as the latter is rotated by the work table while the clamping head is holding the lens against the bearing disk 10 and at the same time permitting the clamping head to automatically adjust itself to the adjacent surface contour of the work, see Figure 5.

A centering pin 12' is secured by means of a rubber or equivalent washer 12'' to the underside of the central portion of the disk 10 to extend downwardly therefrom into a corresponding socket in the lower clamping head 24, as shown in Figure 5, to center the disk on the work table 9 and allow it to be turned to bring its axes indicia in vertical alinement with the corresponding axes of the pattern before the clamping ring is tightened.

The lower clamping head 24 which normally rests upon the upper face of the table 9, is movable vertically into and out of engagement with the underside of the washer 12'' through a central opening in the ring section 12 of the work table 9 and is provided with a central reduced plunger rod or extension 30 extending downwardly therefrom through the tubular shaft 13, said plunger and head being adapted to rotate with the table in a manner presently described.

The upright shaft 13 of the work-supporting table 9 extends some distance below the lower end of the gear case or housing 5 and is provided with diametrically opposite radial slots 33 elongated vertically for receiving a cross pin 34 in the lower end of the plunger rod 30, the outer ends of said pin being secured to a collar 35 which is slidable vertically along and upon the lower end of the shaft 13, as shown more clearly in Figures 5 and 17.

The cross pin 34 is slidable vertically in the slots 33 and serves not only as a connection between the collar and plunger rod to cause those parts to move vertically in unison relatively to the shaft 13, but also acts as a spline to cause said parts and shaft to rotate in unison.

The plunger rod 13 and collar 35 are normally and yieldingly held in their lowermost positions by mechanical means aided by the weight of those parts in a manner hereafter more fully explained.

It is now clear that if the collar 35 is moved upwardly from its normal down position along the shaft 13, it will effect a corresponding upward movement of the plunger rod 30, clamping member 24 and central portion of the diaphragm disk 10 to engage the latter with the underside of the lens a.

Suitable means is provided, however, for delaying this movement until after the upper clamping member 23 has been brought into holding engagement with the upper surface of the lens to prevent displacing the lens from the diaphragm 10.

For this latter purpose, the collar 35 is provided with an annular peripheral groove 37 adapted to receive the forked front end of a rearwardly extending bell-crank lever 38 which is pivotally mounted at 39 upon the interior of one side of the upright frame 1 as shown more clearly in Figures 5 and 17.

This lever 38 is arranged directly under and some distance below the hub 27 of the clamping arm 26 so that the arm and lever are adapted to rock vertically in substantially the same vertical plane about parallel axes, the pivotal studs 39 and 27' being parallel and arranged in substantially the same vertical plane at the rear of the gear case 5, as shown in Figure 5.

The upward rocking movement of the lower clamping arm or lever and resultant upward thrust of the plunger 30 and lower clamping head 24 from their normal down positions is dependent upon the downward rocking movement of the upper clamping arm 26 and its clamping head 23 and can take place only after the upper head 23 is brought into holding engagement with the lens.

The upper clamping arm 26 is also normally and yieldingly held in its extreme upper position by spring-actuated means in a manner hereinafter described. Suitable means, operable at will, is provided for effecting the sequential movement of both of the clamping arms from their normal positions into position for clamping the central portions of the diaphragm 12 and lens between their respective heads 23 and 24, as shown by dotted lines in Figures 2 and 5.

For this latter purpose, the lower side of the hub 27 of the upper clamping arm 26 is provided with a recess 43 forming opposite shoulders 44 and 44' for receiving the upper end of a leaf spring 45 which is riveted or otherwise secured to the rear face of an upright rock arm 46, the latter being pivoted at 47 to the shorter arm 48 on the upper side of the lower clamping lever 38 just above the pivotal stud 39 as shown in Figure 5.

A horizontal rock shaft 49, Figures 2, 3 and 6, is journaled in suitable bearings on the right hand side of the frame 1 between and in vertical alinement with the pivotal studs 27' and 39, to rock about an axis parallel with that of the studs, said shaft having its outer end provided with a forwardly projecting crank arm 51 which is connected by a link 51' to a hand lever 51", the latter being fulcrumed on the outer end of the pivotal pin 39 as shown in Figures 2 and 3.

It will be noted upon reference to Figure 3 that the lower clamping arm 38 and hand lever are both loosely mounted on opposite ends of the pivotal pin 39 which, in turn, is fixedly held in its bearings by a set screw 39', the crank arm 51 being also fixedly secured to the rock shaft 49, as shown in Figure 3.

The upper end of the hand lever 51" is extended from the rear forwardly over the crank arm 51 and is provided on its front end with an upturned finger piece 57 or trigger by which it may be moved forwardly or rearwardly, the crank-arm 51 and link 51' constituting a toggle connection between the rock-shaft 49 and lever 51" for rocking said shaft as the lever is rocked forwardly and rearwardly in a manner hereinafter explained.

The rock shaft 49 is provided with an additional crank arm 52 projecting downwardly and forwardly therefrom into the interior of the frame 1, the lower front end of the crank arm being provided with a laterally projecting stud 53 extending across the front face of the upper end of the upright bar 46 as shown more clearly in Figures 3, 5 and 6 for engaging and rocking the upper end of said bar and leaf spring 45 rearwardly from their normal positions when the hand lever 51" is rocked forwardly from the position shown by full lines to that shown by dotted lines in Figure 2.

As previously stated, the upper clamping arm 26 is normally and yieldingly held in its uppermost position by means hereinafter described and in this position its shoulder 44' will engage the upper end of the leaf spring 45 on the pivoted arm 46 to rock said arm forwardly against the stud 53 on the crank-arm 52 and thereby to effect a corresponding rocking movement of the shaft 49 and its crank arm 51 for normally and yieldingly holding the hand lever 51" in its extreme rearward position as shown by full lines in Figures 2 and 5.

During this return movement of the upper clamping arm 26 and resultant forward rocking movement of the crank arm 52 and lever 46, the lower clamping arm 38 and plunger 30 will be returned under their own weight to their extreme downward positions with the lever 46 and spring 45 still in engagement with the stud 53 and shoulder 44' respectively ready to begin one cycle of operation.

When the lens blank a is properly placed upon the upper face of the table pad 12 with its center and axis marks registered with corresponding marks upon the pad, the lever 51" will be rocked forwardly about the axis of its pivot 39 thereby rocking the crank-arm 51 downwardly and rearwardly through the medium of the link 51' and causing a corresponding rocking movement of the shaft 49 and its crank arm 52.

This rearward rocking movement of the crank arm 52 causes its stud 53 to engage and rock the lever 46 and its spring arm 45 rearwardly about the axis of the pivot 47 whereby the upper end of the spring arm, acting upon the shoulder 44' on the hub 27 of the clamping arm 26, will rock said clamping arm downwardly until limited by the engagement of the clamping member 23 with the upper face of the lens a as shown in Figure 18 and by dotted lines in Figures 2 and 5.

Then, as the forward rocking movement of the hand lever 26 and resultant rearward rocking movement of the crank arm 52 are continued, the upper end of the spring 45 will fulcrum against the shoulder 44' so that the rearward pressure of the stud 53 upon the arm 46 between the shoulder 44' and pivot 47 will cause said pivot to move rearwardly and thereby rock the lower clamping arm 38 upwardly about the axis of the pivotal rod 39.

This upward rocking movement of the front end of the lower clamping arm 38 will cause a corresponding upward movement of the collar 35 and plunger rod 30 along the shaft 13 of the work table 9 thereby bringing the lower clamping member 24 into holding engagement with the underside of the central flexible portion of the lens supporting pad 12 to cooperate with the upper clamping member 23 for yieldingly holding the lens upon the work table to rotate therewith, see Figure 5.

It will be noted that the rock shafts 27' and 49 and also the pivotal rod 39 are arranged in sequence from the top downwardly in the same vertical plane and that the upper end of the hand lever 51" extends forwardly directly over the rock shaft 49 and crank arm 51 so that the hand lever 51 and link 51' constitute a toggle for operating the crank arm 51 and rock shaft 49, see Figure 2.

It is now clear that the pivotal connection of the link 51' with the hand lever 51" is movable through an arc of longer radius than that of the pivotal connection of the link with the crank arm 51 so that as the forward rocking movement of the hand lever is continued after the upper clamping member 23 is brought into engagement with the lens, both of said pivotal connections will be brought into the same or slightly beyond a straight line radial to the axis of the pivotal rod 39 for locking said hand lever and parts actuated thereby in their lens clamping positions, as shown by dotted lines in Figure 2.

The upper front end of the hand lever 51" is provided with an upwardly projecting finger piece 57 cooperating with a thumb piece 57' which is rigidly secured in any suitable manner to the right hand side of the frame 1 directly in front of the hand lever and within easy reaching distance of the finger piece 57 by one and the same hand for convenience of operation of said hand lever, as shown more clearly in Figure 2.

*Cutter mechanism*

As shown more clearly in Figure 3, a vertical rock-shaft 61 is journaled in an upright bearing 61' on the left hand side of the frame 1 at the corresponding end of the rock shaft 27' with its axis intersecting that of the last named rock shaft and its upper end provided with a bifurcated head 60 in which is journaled a horizontal rock-shaft 59 in the same plane as the rock-shaft 27'.

The shaft 59 is provided intermediate its ends with an enlarged annulus 59" carrying upon its periphery a substantially circular hub or collar 58, said annulus and collar being interposed between and held against axial movement by the opposite arms of the head 60 and secured to each other to rock in unison about their axis in a manner presently described, see Figures 3 and 7.

A spindle 63 is journaled in diametrically registering openings in the rock shaft 59 and collar 58 to rock about an axis at right angles to that of the shaft and collar and also to lock those parts to each other so that all three parts may rock in unison about the axis of the shaft and collar, the lower rear end of the spindle 63 being provided with a shoulder 63' engaging the adjacent portion of the periphery of the collar 58 to hold the spindle against upward and forward axial movement, as shown in Figure 7.

A cutter supporting arm 65 is clamped or otherwise secured to the upper front end of the spindle 63 and extends upwardly and forwardly therefrom to rock therewith about the axis of the spindle and also about the axis of the shaft 59, said arm being adjustable angularly relatively to the spindle for a purpose hereinafter described and is held in its adjusted position by a clamping screw 65' as shown more clearly in Figure 7.

The collar 58 is preferably secured to the enlarged annulus of the shaft 59 by means of a set screw 58', Figure 7, to relieve the spindle 63 from excessive friction and allow it to turn freely in its bearings, said spindle being held against rearward axial movement in its bearings by a part of the automatic tilting mechanism hereinafter described.

The front end of the cutter supporting arm 65 is provided with a socketed head 65" in which is mounted a tubular sleeve 67 carrying a co-axial cutter spindle 68 which is provided with lower and upper end heads 69 and 70 and is journaled in said sleeve by means of anti-friction end thrust bearings 71 and 71' for free rocking movement relatively thereto, the upper head 70 being adjustable to take up wear of the bearings, as shown more clearly in Figure 8.

The lower head 69 of the spindle 67 is bifurcated and has the lower ends of its opposite arms provided with slotted bearings 73 open at the bottom and offset to one side of the axis of the spindle for receiving a relatively small shaft 76 upon which is mounted a cutter 75 having its cutting point disposed in the axis of the spindle 63 to avoid marring the lens when the cutter arm is turned about said axis with the cutter in engagement with the lens.

That is, the axis of the cutter spindle 68 is arranged to intersect that of the spindle 63 at right angles thereto and approximately the same distance from the axis of the rock shaft 59 as the axis of the work table 9 so that when the cutter arm 65 is rocked downwardly from its normal up position as shown in Figures 2, 5 and 7, the cutter 75 will be brought into contact with the surface of the lens for cutting the lens as the table is rotated in the manner previously explained.

The cutter shaft 76 is provided with a bail 76' which is movable into and out of a slot 77 in the offset side of the head 69 for locking and releasing the cutter shaft and cutter in and from their operative positions, the cutter being normally held against axial displacement by and between the opposite arms of said head, as shown more clearly in Figures 18, 20 and 22.

That is, when the locking member 76' is in its locking position as shown by full lines, Figure 8, it serves to hold the shaft 76 with the cutter 75 thereon in operative position in the lower end of the head 69, but when moved by hand to the position indicated by dotted lines, Figure 8, permits their removal from the head thereby providing a convenient and expeditious means for replacing the cutter when worn or otherwise impaired.

The head 65" of the arm 65 is preferably slotted through one side and the opposite walls of the slot are connected by a clamping bolt 65' by which said walls may be tightened upon the periphery of the sleeve 67 to firmly hold the latter in operative position or released to permit the removal of the sleeve with the cutter spindle 68 thereon by downward displacement whereupon the spindle head 70 may be removed to permit endwise displacement of the spindle.

When the locking member 76 with the cutter thereon is released from the head 69, its ends may be withdrawn from the corresponding ends of the cutter against their own spring tension to allow said cutter to be removed and replaced by a similar cutter when necessary or desirable.

It will be observed upon reference to Figure 8 that the axis of the cutter is offset to one side of the axis of the spindle 68 so that when the cutter is brought into engagement with the surface of the lens under yielding pressure during the rotation of the table 9, the cutter will automatically adjust itself to trail substantially tangenial to the line being cut, thereby assuring at all times the most efficient cutting position of the cutter, it being understood that the ball bearings 71 and 71' permit the utmost freedom of rotation of the cutter supporting head about the axis of the spindle 68.

The angular movement of the cutter spindle 68 about its axis for trailing purposes is preferably limited to about ninety degrees (more or less) and to this end one side of the intermediate portion of the spindle is more or less flattened at 78 for engagement by the convexed inner end of a cup-shaped plunger 79 which is movable in a radial opening 79' in the adjacent side of the sleeve 67 and is spring pressed into engagement with said flattened side by a light coil spring 80 having one end seated in the plunger and its other end engaged with the inner periphery of the head 65" the length of the plunger being slightly less than the distance between the flattened side 78 and inner periphery of the head to limit without retarding said free angular trailing movement.

It is to be understood, however, that the spring pressure of the plunger 79 against the flattened face 78 is sufficiently light to allow the cutter head 69 to turn freely in its supporting sleeve 67, particularly when cutting relatively sharp angles or irregular contours in the work.

The head 60 of the vertical rock shaft 61 is provided with a hollow outer end boss 60' extending around the adjacent portion of the rock shaft 59 which extends outwardly through and beyond said boss for receiving the hub of a hand lever 84 and a coil spring 88, the latter being coiled around the shaft and having one end engaged in an axially extending opening in the annular enlargement of the shaft 59 and its other end extended into a radial opening in the lower side of the boss 60' and tensioned to normally and yieldingly hold the cutter arm 65 in its extreme upper position, as shown in Figures 2, 4, 5 and 7.

The hub of the hand lever 84 is secured by a set screw 84' or equivalent fastening means to the outer end of the rock shaft 59 for rocking the latter downwardly against the action of the spring 88 and thereby to rock the cutter arm downwardly from its normal position to engage the cutter 75 with the upper surface of the lens *a*, as shown by dotted lines in Figures 2 and 5, said spring also serving to return and to yieldingly hold the upper clamping arm 26 to its extreme upper position through the medium of the automatic tilting mechanism for the cutter arm, presently described.

*Tilting means for cutter support*

Owing to the fact that the surfaces of the same lens and of different lenses to be cut are of widely varying contours, it is desirable to provide some means for automatically causing the cutter spindle 68 and its cutter 75 to assume a position substantially normal or at right angles to the particular part of the surface of the lens engaged by said cutter.

For this purpose the clamping arm 26 is provided with a transverse socket 26' in which is mounted one end of a spindle 83 having its other end provided with a relatively thin metal plate 82' which, in turn, is formed with an opening 82" for receiving the adjacent portion of the spindle 63 and is provided with a toothed rack 82 meshing with a gear segment 81 on the spindle 63, as shown more clearly in Figures 10, 19, 21 and 23.

The distance between the lower and upper walls of the opening 82" is somewhat greater than the diameter of the gear segment 81 to allow a limited downward movement of the spindle 63 and its cutter-supporting arm 65 relatively to the rack 82 and resultant angular movement of said arm about the axis of the spindle 63 as the downward movement of the hand lever 84 is continued against the action of the spring 88 after the clamping members 23 and 24 have been brought to their clamping positions in the manner previously explained.

It will now be understood that when the hand operated levers 51" and 84 are released, the spring 88, acting upon the annulus 59" of the shaft 59, will rock the cutter supporting arm 65 upwardly thereby engaging the spindle 63 with the upper wall of the opening 82" in the rack plate 81' for similarly raising said plate and its supporting spindle 83, which, in turn, causes a corresponding upward rocking movement of the upper clamping arm 26 and resultant forward rocking movement of the lever 46 about its pivot 47 through the engagement of the shoulder 44' on the hub of the arm 26 with the upper end of the leaf spring 45, as shown in Figure 5, until limited by the engagement of the crank arm 52 with the front wall of the opening in the frame through which the crank arm extends as shown in Figures 1 and 6.

The spring 88, therefore, serves to yieldingly hold the cutter supporting arm 65 and also the upper clamping arm 26 in their extreme upper or normal starting positions, as previously explained, and at the same time causes the shoulder 44' of the arm 26 to rock the leaf-spring 45 and its supporting lever 46 forwardly about the axis of the pivot 47 for releasing the lower clamping lever 38 and allowing the plunger 30 and its clamping member 24 to return by their own weight to their lowermost positions, as shown in Figure 5.

The cutter supporting arm 65 and upper clamping arm 26 and their operating means are arranged in such manner as to cause the cutter arm to raise in advance of the clamping arm and also to cause the clamping arm to move downwardly to its clamping position in advance of the cutter arm with the result that the upper clamp 23 will be brought into engagement with the work and released in advance of the cutter 75.

These latter movements are effected by the forward movement of the hand lever 51" in the manner previously explained after which the hand lever 84 may be depressed to bring the cutter into engagement with the work resulting in the automatic adjustment of the cutter arm 65 about the axis of the spindle 63 to bring the cutter normal to the surface of the work engaged thereby.

This automatic angular or tilting adjustment of the cutter is, of course, limited to a certain range through and to opposite sides of a vertical to conform to the various contours of standard lenses, whether such contours are plain, convex, or concave, and is determined, approximately, by the amount of vertical play of the spindle 63 in the opening 82".

For example, the diameter of the spindle gear 81 and height of the opening 82" are so relatively proportioned that when the spindle gear is engaged with the upper wall of the opening, the cutter arm 65 will assume a definite normal angle to the right hand of a vertical as shown in Figures 1 and 18, this angle being established and maintained while the arm 63 is being moved upwardly to and in its uppermost position.

Then, assuming that it is desired to cut upon a concave surface of greater radius than the minimum radius of standard forms of lenses for which the cutter arm is normally set, the hand lever 51″ will first be rocked forwardly to bring both clamping members 23 and 24 to their clamping positions for holding the lens firmly upon the table 9 or until the lever is locked by the straightening of its toggle connection with the crank arm 51, as previously explained.

During this lens clamping operation, the cutter arm 65 and hand lever 84 will have been rocked downwardly against the action of the spring 88 by reason of the engagement of the top wall of the rack-plate 82′ with the spindle 63 until the cutter arm and spindle assume the positions shown in Figures 18 and 19 respectively, after which the hand lever 84 and cutter arm 65 will be further depressed against the action of the spring 88 until limited by the engagement of the cutter 75 with the work.

This additional downward movement of the hand lever 84 and cutter arm 65 causes the gear segment to roll along the then stationary rack 82 resulting in the angular adjustment of the cutter arm 65 in a counter clockwise direction about the axis of the spindle 63 to bring the cutter spindle 68 and its cutter 75 to a position at substantially right angles to the portion of the surface of the work engaged by said cutter, as shown by dotted lines in Figures 18 and 19.

It will now be evident that the amount of angular adjustment of the cutter spindle will depend upon the distance of additional travel of the cutter before it engages the work or rather upon the distance of the work from the cutter when the cutter arm is brought to the limit of its downward movement by the operation of the clamping means.

For example, if the portion of the work to be engaged by the cutter is in about the same plane as the lower face of the upper clamping member, as shown in Figure 20, the additional downward movement of the hand lever 84 and cutter arm 65 will have to be greater than when engaging the concave face of the work as shown in Figure 18, resulting in a correspondingly greater angular adjustment of said cutter arm and its spindle 68, it being understood that under these conditions the downward rolling movement of the gear segment 82 will be similarly increased as shown in Figure 21.

In like manner, if the cutter is to engage the work in a plane below that of the lower face of the upper clamping member 23, as shown in Figure 22, the additional downward movements of the cutter arm 65 and gear segment 82 will have to be still greater than in the previous example, resulting in an increased angular adjustment of the cutter arm to bring its cutter supporting spindle normal to the surface of the work engaged by the cutter, see Figure 23 in which the spindle 63 and gear segment 81 are in their extreme downward positions relatively to the rack 82.

When the cutter has been brought into engagement with the work in the manner described, downward pressure upon the hand lever 84 may be maintained to hold the cutter in cutting engagement with the work under the yielding action of the spring 88 which also serves to prevent excessive cutting pressure during the rotation of the work table 9 with the work thereon, in the manner previously explained.

A single revolution, only, of the work table is necessary to cut the lens to the required shape and when this is accomplished, the upper end of the hand lever 51″ will be rocked rearwardly to break its toggle lock with the crank arm 51 and thus permit the spring 88 to return the cutter arm 65 and its operating means to their normal position.

That is, when the lever 51″ is released, the spring 88 raises the cutter arm 65 and hand lever 84 and incidentally rolls the segment 81 upwardly along the rack 82 to restore the cutter arm angularly to its normal position until the segment engages the upper wall of the rack at which time the continued upward movement of the cutter arm will restore the clamping arm 26 to its normal up position resulting in the return of the lever 51″ and lower clamping arm 38 to their normal starting positions, as shown in Figures 2 and 5.

*Lens shaping means*

A centering pin 94 is secured by a set screw 94′ in the lower end of the tubular hub 13 of the work-table 9 to extend downwardly therefrom for receiving and supporting a centrally apertured pattern 96 which is yieldingly and releasably held against the lower end face of said hub coaxial therewith by frictional retaining means presently described, and is also provided with diametrically opposite openings for receiving a pair of studs 95 on the lower end of the hub to cause the pattern to rotate in unison with the work table, see Figures 5 and 14.

The means for holding the pattern against the lower end of the hub 13 preferably comprises a relatively small tube 94″ tightly fitted in a corresponding diametrical opening in the centering pin 94 in the plane of the lower face of the pattern and carrying in its opposite ends a pair of balls 95′ which are spring-pressed outwardly into engagement with the lower face of the pattern by a light coil spring 95″ within the tube as shown in Figures 5 and 14, the outer ends of the tube 94″ being crimped inwardly to hold the balls against outward displacement.

A bell crank lever 105 is loosely journaled upon the lower end of the upright rock shaft 61, against the lower end face of the bearing 61′ to rock laterally about the axis of said shaft relatively thereto in about the same horizontal plane as the pattern 96 and has one of its arms extended forwardly across the outer edge of the pattern and provided with a socket 106 for receiving a hardened bearing pin 107 which engages the perimeter of the pattern substantially radial thereto as shown more clearly in Figure 14, so that the rotation of the pattern will rock the lever 105 about the axis of the upright shaft 61 in a manner presently described.

The threaded bearing pin 107 is adjustable axially relatively to the lever 105 by means of a nut 107′ to compensate for wear and to enable the crank arm to be properly set in relation to the pattern, said pin being held in its adjusted position by means of a set screw 107″, Figure 14.

The other arm of the lever 105 projects laterally and outwardly from the upright shaft 61 and is provided with a vertical socket in which is journaled a stud 104 carrying a cam 103 and a circular index plate 108 both of which are secured to the stud adjacent the lower and upper faces of the lever for angular adjustment relatively thereto in a manner and for a purpose presently described.

An additional bell crank lever 97 is clamped by means of a bolt 97' to the lower end of the upright rock shaft 61 just below the lever 105 and has one of its arms, as 98, projecting outwardly and laterally across the rear face of the cam 103 and provided with a hardened bearing plate 102 which is disposed in a vertical plane substantially radial to the axis of the cam for engagement therewith, said plate being secured to the lever by means of a clamping screw 102', as shown in Figure 13.

The other arm as 98' of the lever 97 projects forwardly from the upright shaft 61 and is connected to one end of a tension spring 99 having its other end passed through an opening 99' in the frame 1 and connected to a hand lever 100 which is pivoted at 100' to the frame 1 to swing horizontally, see Figure 14.

The outer end of the spring is pivotally connected to the lever at one side of the pivot 100' in such manner that when the lever is rocked rearwardly against the frame 1 both ends of the spring and the pivot 100' will be in approximately the same straight line, as shown in Figure 14, thereby placing the spring under maximum tension to yieldingly hold the bearing member 102 in contact with the cam 100 and also to yieldingly lock the lever in its spring-tensioning position, it being evident that the forward movement of the lever will release the tension of the spring and thereby release the pressure of the member 102 upon the cam 103.

When the spring is placed under tension in the manner described with the resultant pressure of the member 102 against the cam 103, this pressure will be transmitted through the cam and its supporting stud 104 to the lever 105 for yieldingly holding the bearing pin 107 in contact with the pattern 96 which, when rotated, reacts upon the levers 105 and 97 to rock the upright shaft 61 and cutter arm 75 toward and from the axis of rotation of the work table 9 and lens which has been previously clamped thereto.

It is now clear that when the lens is properly placed and clamped upon the work table and the cutter arm is rocked downwardly in the manner described to press the cutter against the lens, the rotation of the work table with the lens thereon through one complete revolution, will cause said lens to be cut to exactly the form of the pattern.

It is frequently necessary, however, to vary the size of the cut lens without changing the pattern or form of the lens and for this purpose I have preferably employed the two levers 97 and 105 and the interposed cam 103 arranged in the manner shown in Figures 3, 13 and 14.

For example, if a pattern 96 of certain size and form is placed on the centering pin 94 in the manner described and it is desired to cut the lens a on the rotary table 9 to the same size as or to different size than that of the pattern it is simply necessary to adjust the index plate 108 rotarily by hand until the graduation thereon representing the size required is registered with the fixed point on its supporting lever 105 thereby effecting a corresponding angular movement of the cam 103 resulting in similar angular movements of the lever 97, upright shaft 61 and cutter arm 65 about the axis of said shaft.

That is, the cam 103 is preferably of the continuous throw or involute type adapted to produce its maximum throw in one revolution so that when adjusted to bring its highest point into engagement with the bearing 102 on the lever 97 as shown in Figure 13 it will effect a corresponding rocking movement of said lever together with the upright shaft 61 and cutter arm 65 to move the cutter 75 to its maximum distance from the axis of the work table 9 somewhat greater than the maximum radius of the pattern, for cutting the lens to a larger size than but to the same form as that of said pattern.

If, however, the cam 103 is adjusted to bring its lowest point into registration with the bearing member 102 the latter will be brought into engagement with said low point by the action of the spring 99, thereby causing the shaft 61 and cutter arm 65 to be rocked in a counterclockwise direction to bring the cutter 75 to its innermost position a distance from the axis of the rotary work table equal to or less than the minimum radius of the pattern for cutting the lens to the same size as or to a smaller size than that of the pattern, it being understood that the angular adjustment of the cam to any intermediate position will cause the lens to be cut to a corresponding size without in any way changing the form of the lens.

These angular adjustments of the cam 103 are preferably made by the rotation of the index wheel or plate 108 which is provided in its underside with a key way 108' for receiving a flattened upper end of the stud 104 to which the cam is secured, as shown more clearly in Figure 14, the inward rocking movement of the lever 105 and other parts actuated by the spring 99 being limited by a stop 105'' bridging across the opening in the adjacent side of the frame 1, see Figures 5 and 14.

As previously stated, the rotation of the pattern 96 against the front end of the lever 105 in cooperation with the spring 99 serves to rock said lever and, through the medium of the cam 103, to also rock the lever 97 and upright shaft 61, thereby causing a similar rocking movement of the cutter arm 65 and hand lever 84 about the axis of said shaft.

For convenience of operation of the pressure lever 84 by the left hand while the work table is being rotated by the right hand, a finger piece 93 is riveted or otherwise secured to the underside of the laterally projecting arm of the lever 105 to project forwardly therefrom within easy reaching distance of the handle of the lever 84 as shown more clearly in Figure 1, it being understood that the finger piece 93 is rocked laterally with the hand lever 84 to maintain the same angular relation to the axis of the rock shaft in all positions, see Figure 14.

*Modified structure*

The general structure and operation of the machine shown in Figures 24 to 42 inclusive is similar to that previously described except in certain specific details hereinafter described.

In the work-carrier, the lens a is supported directly upon a raised resilient or soft rubber annulus 12 which is mounted in a corresponding recess 11 in the upper face of porcelain or equivalent ring-disk 10 on the work table 9 to rotate therewith, as shown in Figure 29, said disk having its upper face provided with indicia representing the axes with which the correspondingly marked axis on the lens is adapted to be registered.

In the operating means for rotating the work-table 9 the gear 19 on the hub 13 of the work table is inverted to abut against the upper side of the bottom wall of the gear chamber 6 with its teeth facing upwardly for engagement with the overlying pinion 18 on the shaft 15, as shown in Figure 24, the hand-crank 17 being rigidly secured to the outer end of said shaft for rotating the same and also the work table in one direction or the other as may be desired.

It will also be noted upon reference to Figure 29 that the centering pin 94 for the pattern 96 is formed integral with the hub 13 of the work table 9 and that a single ball 95' is used to yieldingly hold the pattern in operative position on said pin, as shown in Figure 30.

The lower clamping member 24 on the upper end of the plunger 30 is provided with a raised annulus 32 of soft rubber or equivalent material seated in a corresponding recess 29 for engaging the underside of the lens a when the plunger is elevated immediately following the engagement of the upper clamping member 23 with the upper surface of the lens, see Figure 29.

In Figures 24, 25 and 26, the hand lever 51 for rocking the crank shaft 49 is secured directly to the outer end of said shaft to project forwardly therefrom and has its front end provided with a handle by which it may be rocked downwardly along a relatively stationary toothed rack 55 on the frame 1, said hand lever being provided with a pawl 54 adapted to engage the teeth of the rack under the action of a spring 56 for holding the hand lever and parts actuated thereby in their adjusted positions, the pawl 54 being releasable from its holding position by means of a handle 57 on the hand lever, see Figure 25.

The hubs of the lower and upper clamping arms 38 and 26 are provided respectively with rearward extensions 40 and 41 connected by a tension spring 42 which serves to yieldingly hold said clamping arms and parts operated thereby in their normal inoperative positions as shown in Figure 29.

That is, when the hand lever 51 is released, the spring 42, acting upon the upper clamping arm 26 to elevate the same, causes the shoulder 44' on the hub of said arm to engage the leaf spring 45 of the lever 46 for rocking said lever forwardly about its pivot 47 and against the stud 53 on the crank arm 52 resulting in a similar forward rocking movement of said crank arm and upward rocking movement of the hand lever 51 to its normal position, as shown in Figure 25 and also in returning the lower clamping arm 38 and plunger 30 to their normal positions, as shown in Figure 29.

In the construction shown in Figures 24, 26 and 33, the hub 58 carrying the cutter arm 65 is mounted upon a hollow shaft section 59 which is journaled on the upper end head 60 of the upright rock shaft 61 to rock vertically and also to rock laterally with said rock shaft about the axis thereof, the cutter arm 65 having its spindle 63 journaled in a diametrical opening in the hub 58 and shaft section 59 in the manner and for the purpose previously explained.

The hollow shaft section 59 is flexibly coupled to another substantially coaxial hollow shaft section 85 through the medium of a coupling member 89 and a coil spring 88, as shown more clearly in Figure 26, the coupling member 89 being provided with diametrically opposite vertical trunnions 59' journaled in corresponding openings in the hollow shaft section 59 for relative lateral rocking movement therein.

The hollow shaft section 85 is journaled in suitable bearings 86 on the left hand side of the frame 1 and adjacent the outer end of the coupling member 89 and coaxial with the supporting stud for the clamping arm 26 for receiving and supporting the rear end of a forwardly projecting hand lever 84, as shown in Figure 26.

The coil spring 88 is arranged lengthwise of and within the shaft section 85 and has its inner end rigidly secured to the coupling member 89 and its outer end rigidly secured to the adjacent end of said shaft section to establish a yielding turning connection between both shaft sections 59 and 85 so as to allow a limited lateral rocking movement of the cutter arm 65 with the upright rock shaft 61 when the latter is operated by the pattern through the levers 97 and 105 in the manner previously explained.

As shown more clearly in Figures 35 and 36, the shaft section 85 is provided with a circumferentially elongated slot 90 for receiving a radial stud 91 on the hub of the pressure lever 84 which is normally and yieldingly held in its extreme up position by a tension spring 87 having its opposite ends connected to lugs 87' and 87'' on the frame 1 and hub of the lever 84 respectively, thereby causing the upper end wall of the slot 90 to normally rest against the stud 91, as shown in Figure 35.

The slot 90 is of sufficient circumferential length to allow the shaft section 85 to turn with the cutter arm 65 about its axis as the clamping lever 26 is rocked downwardly from its normal up position against the action of the spring 42, Figure 29, or until the clamping members 23 and 24 are brought into engagement with the work in the manner described, thereby moving the upper end wall of the slot 90 away from the stud 91 and allowing the pressure lever 84 to be rocked downwardly against the action of the spring 87 to the position shown in Figure 36, to bring the cutter arm 65 to its cutting position until limited by an adjustable screw stop 91' Figures 35 and 36.

A stationary finger piece 93 is bolted or otherwise secured to the frame 1 to project forwardly therefrom below and within easy reaching distance of the pressure lever 84 to facilitate the downward movement of said pressure lever when pressing the cutter against the work for cutting purposes as the work table 9 with the work thereon is rotated.

The means for rocking the upright shaft 61 and cutter arm 65 about the axis of said shaft to move the cutter 75 toward and from the axis of rotation of the work table 9 as controlled by the pattern 96 and spring 99, is quite similar to that described in connection with Figures 1 to 23 inclusive except that the coupling member 89 is free to yield axially and is yieldingly held in coaxial relation with the shaft section 85 by the compression spring 88 as the upright shaft 61 and cutter arm 65 are oscillated about the axis of said upright shaft in the manner previously described, seed Figures 24 and 29.

The indexing device for regulating the size of the cut lens is quite similar to that described for the construction shown in Figures 1 to 23 inclusive except that the index plate 108 is provided with a knob or hand-wheel 108'' by which it may be turned for properly positioning the cam 103, as shown in Figures 26 and 34.

In this modified machine, the cutter arm 65 is normally inclined outwardly from a vertical with the cutting edge of its cutter in a plane a distance below the lower face of the upper clamping member 23 substantially equal to the vertical distance of travel of the pinion 63 in the opening 82'' of the rack plate 82' to cause the cutter to engage the work in advance of the engagement of said clamping member while the latter is being rocked downwardly by the hand lever 51, during which time the lens will be held in place upon the work table by hand.

That is, when the hand lever 51 is released, the clamping arm 26 will be rocked upwardly to its normal up position by the spring 42, thereby causing the lower wall of its rack plate 82' to engage the lower side of the pinion shaft 83 on the cutter arm 65 for effecting a corresponding upward rocking movement of said cutter arm and allowing the pressure lever 84 to be rocked to its uppermost position by its spring 87, as shown in Figure 35 during which operations the lever 46 and crank arm 52 will have been rocked forwardly by reason of the engagement of the shoulder 44' with the upper end of the leaf spring 45 for restoring the hand lever 51 to its uppermost position as shown in Figure 25, thus releasing the lower clamping arm 38 and permitting the return of the plunger 30 and its head 24 to their lowermost positions, as shown in Figure 29.

It is now clear that when it is desired to cut a lens which has been properly placed upon its supporting surface on the work table 9, the hand lever 51 will first be depressed to rock the crank pin 53 rearwardly and thereby cause the upper end of the leaf spring to engage the shoulder 44' for effecting a corresponding downward rocking movement of the upper clamping arm 26 against the action of the spring 42 and also allowing a similar downward rocking movement of the cutter arm 65 by its own weight aided by the rack and pinion connections between said arms until the cutter 75 is brought into engagement with the work.

During these movements the shaft section 85 will have been rocked about its axis independently of the pressure lever 84 through its connection with the shaft section 59 of the cutter arm 65 until limited by the engagement of the lower end wall of the slot 90 with the stop pin 91, Figures 35 and 36, at which time the cutter 75 will have been brought into engagement with the work.

The downward rocking movement of the hand lever 51 is then continued for sequentially forcing the clamping arms 26 and 38 to their lens-clamping positions during which the rack 82 will rock the pinion shaft 63 and its cutter arm 65 about the axis of said shaft to bring the cutter spindle normal to the surface of the lens as shown by dotted lines in Figures 39 and 40, and also in Figures 41 and 42.

In Figures 37 and 38 the clamping arm 26, cutter arm 65 and their respective rack 82 and pinion 81 are shown in their normal up or starting positions. In Figures 39 and 40 the same parts are shown in their relative position just at the time the cutter is brought into engagement with the concave surface of a concavo-convex lens, the dotted lines indicating their relative positions when the clamping members are brought to their lens clamping positions, while Figures 41 and 42 show the same elements in position for cutting upon the convex surface of the lens.

It will be noted that in the modified construction shown in Figures 24 to 42 inclusive, the tilting operation of the cutter arm 65 about the axis of its shaft 63 is substantially the reverse of that shown in Figures 1 to 23 inclusive in that the pinion shaft 63 is normally engaged with the lower wall of the rack 82; that the cutter 75 is brought into engagement with the work in advance of the upper clamping member 23, and that the cutter arm 65 is normally inclined outwardly from a vertical and while the resultant operations of both machines are similar it is believed that the preferred structure shown in Figures 1 to 24 inclusive is the more practicable and reliable in the hands of all users.

The range of angular movement of the cutter arm 65 about the axis of the spindle 63 is predetermined by the relative heights of the portions of the lens to be engaged by the cutter 75 and clamping member 23 respectively when the lens is properly placed upon the table 9 while the degree of said angular adjustment is dependent upon the amount of downward movement of the rack 82' relatively to the pinion 81 after the downward movement of the pinion has been limited by the engagement of the cutter with the work.

The downward movement of the rack 82 is then continued for rocking the pinion and cutter arm to bring the cutter spindle to the proper angle normal to the surface of the work or until limited by the engagement of both clamping members 23 and 24 with the work.

The pressure lever 84 will then be pressed downwardly by hand to hold the cutter arm 65 in its cutting position under the yielding torque of the spring 86 during which the work table 9 with the lens thereon will be rotated one revolution to complete the cutting operation.

Immediately following this cutting operation the levers 84 and 51 will be released in sequence to allow the springs 92 and 42 to return them together with the clamping arm 26 and cutter arm 65 to their normal uppermost positions thereby releasing the lower clamping arm 38 and allowing the lower clamping member to return downwardly to its normal position whereupon the cut lens may be removed and replaced by another lens ready for a repetition of the operation described.

During this upward movement of the upper clamping arm 26 and its rack 82, the latter will rock the pinion 81 and its cutter arm in a counter clockwise direction for restoring the cutter spindle 68 to its normal angle of outward inclination shown in Figure 37, as limited by the engagement of the lower side of the rack plate 82' with the underside of the pinion 81 for restoring the cutter arm 65 to its normal up position, as shown in Figure 33.

*Operation*

The operation of the machines, briefly described is as follows:

Assuming that the lens clamping arms 38 and 26 and their operating means and also the cutter arm 65 and its operating means are in their normal open positions, as shown in Figures 1, 2 and 5 and that the lens to be cut with its axis marks thereon is properly placed upon its supporting surface on the work table 9 and that the pattern for regulating the form of the cut lens is also placed in proper position upon the centering pin 94.

Then, if the machine shown in Figures 1 to 23 inclusive, is to be used, the lens to be cut with its axis marks thereon, is placed in proper position upon the supporting surface of the work table 9 after which the hand lever 51'' will be rocked forwardly from the position shown by full lines to the position shown by dotted lines in Figure 2, thereby rocking the crank arm 51 downwardly through the medium of the connecting link 51' to rock the shaft 49 which, in turn, causes a corresponding rearward rocking movement of 75 the crank arm 52 against the lever 46 for rocking said lever about the axis of its pivot 47.

This rearward rocking movement of the lever 46 causes the upper end of the spring 45 to engage the shoulder 44' on the hub of the upper clamping lever 26 for rocking said clamping lever downwardly until the clamping member 23 engages the upper surface of the lens, thereby limiting the further downward movement of the clamping arm at which time the continued forward movement of the hand lever 51' to its self-locking position, as shown by dotted lines in Figure 2, will place the leaf spring 45 under tension and cause the lower clamping arm 38 to be moved upwardly for pressing the lower clamping member 24 against the underside of the lens supporting diaphragm 10 to firmly clamp the lens to the rotary work table.

This downward rocking movement of the upper clamping arm 26 causes a corresponding downward rocking movement of the cutter arm 65 by reason of the engagement of the upper wall of the rack 82' on the upper clamping arm 26 with the pinion shaft 63 on the cutter arm 65, it being understood that the cutting edge of the cutter 75 is normally in a plane above the lower surface of the clamping member 23 and will maintain that relation until the cutter arm 65 is further depressed.

The pressure lever 84 is then rocked downwardly to bring the cutter 75 into engagement with the upper surface of the work during which movement the cutter supporting arm will have been tilted from its normal position shown by full lines in Figure 18 to the position shown by dotted lines in the same figure, by reason of the rolling action of the pinion 81 against the teeth of the rack 82, thus bringing the cutter spindle normal or at right angles to the surface of the work engaged by the cutter.

As the cutter is held against the work by downward pressure upon the lever 84, the amount of pressure is limited by the spring 88 but is sufficient for cutting purposes whereupon the work table 9 with the lens thereon will be rotated one revolution in the manner described, to complete the cutting operation of that particular lens.

The angular adjustment of the cutter arm 65 from its normal position shown by full lines in Figure 18 is dependent upon the amount of downward rocking movement of the cutter arm after the clamping members 23 and 24 have been brought to their clamping positions and in Figure 18 I have shown a concavo convex lens with its concave side uppermost and, therefore, the distance through which the cutter arm must travel before the cutter is engaged with the work is considerably less than when the cutter is to operate upon a plain lens as shown in Figure 20, the amount of travel of the cutter arm being still greater when operating upon a convex surface, as shown in Figure 22.

The concave surface shown in Figure 18 and the convex surface shown in Figure 22 represent the extreme curvatures of standard lenses to be cut the distances through which the cutter 75 is adapted to be moved after the clamping members have been brought to their clamping positions and the rack 82 and pinion 81 are so relatively arranged or calibrated as to cause the cutter spindle to automatically assume a position normally to the surface to be cut for all curvatures or plain surfaces between the concave surface, as shown in Figure 18, and the convex surface shown in Figure 22.

As soon as the cutting operation is completed, the downward pressure upon the hand lever is released to rock the cutter arm 65 upwardly and thereby to roll the pinion 81 along the rack 82 for restoring the cutter arm to its normal angular position about the axis of its supporting spindle 63 at which time the spindle 63 will have engaged the upper wall of the rack 82' for limiting the further angular movement of the cutter arm beyond its normally set position.

As soon as the pinion shaft 63 engages the upper wall of the rack 82', the continued action of the spring 88 will rock the cutter arm 65 upwardly to its extreme upward position, thereby causing a corresponding upward rocking movement of the clamping arm 26 and resultant downward movement of the lower clamping member 24 for releasing the cut lens, it being understood that the upward rocking movement of the clamping arm 26 will cause the shoulder 41' to engage the leaf spring 45 for releasing the lower clamping arm 28 and allowing said lower clamping arm, together with the plunger 30 and clamping member 24 to return downwardly under their own weight.

In the operation of the machine shown in Figures 24 to 42 inclusive, the hand lever 51 is first rocked downwardly thereby rocking the shaft 49 upon which the crank arm 52 is mounted for effecting the sequential operation of the clamping arms 26 and 38 to their lens clamping positions, as previously described.

This downward rocking movement of the upper clamping arm 26 allows the cutter arm 65 to rock downwardly under its own weight aided by the engagement of the rack 82 with the pinion 81 until the cutting member 75 is brought into engagement with the work in advance of the engagement of the upper clamping member 23 with the work.

The downward movement of the lever 51 is then continued thereby effecting a corresponding downward movement of the upper clamping arm and its rack 82 relatively to the cutter arm 65 and its supporting spindle or pinion 81, thus causing the spindle 63 and cutter arm to rock about the axis of said spindle for bringing the cutter spindle 68 normal to the surface of the work engaged by the cutter 75, the amount of angular movement of the cutter arm 65 and its spindle 68 being dependent upon the distance of travel of the upper clamping member from the position which it assumes when the cutter engages the work to the surface of the work.

When the cutter 75 and clamping members 23 and 24 have been brought into engagement with the work in the manner just described, the pressure lever 84 will be depressed against the action of its spring 87 for cutting the lens while the table with the lens thereon is being rotated one revolution.

As soon as this cutting operation is completed, the levers 84 and 51 will be released, thereby allowing the clamping arm 26 and its rack 82 to be returned upwardly by the spring 42 until the lower wall of the rack plate 82' engages the lower face of the pinion 81 for rocking the cutter arm upwardly.

This return movement of the rack 82 relatively to the spindle 63 acts upon the pinion 81 to restore the cutter arm to its normal upwardly and outwardly inclined position as shown in Figure 37.

Otherwise, the operation of the machine is quite similar to that described for the construction shown in Figures 1 to 23 inclusive.

It will be noted that the surface areas of both clamping members 23 and 24 are substantially equal and that they are brought into engagement with opposite faces of the central portions of the lenses under approximately equal yielding pressure of the spring 45 thus permitting the machine to be used for cutting any of the lenses in common optical usage irrespective of the varying thickness of the rims or centers without liability of breakage of such lenses and also without extra adjustment of either clamping member.

Attention is called to the fact that in the modified construction as shown in Figures 24 to 42 inclusive, the cutting pressure arm 84 is adapted to swing up and down but is rigidly held against lateral movement in which case the coil spring 88 and coupling member 89 constitute what may be termed a universal joint connection between the cutter carrying spindle 61 and pressure arm to allow said spindle to be rocked laterally through its connections with the pattern 96.

It will also be noted that in this modified construction the hand grip 93 is rigid with the frame of the machine and, therefore, is not movable vertical or laterally, but its purpose is to enable it to be engaged by the same hand which operates the pressure arm 84 to steady the pressing movement of said arm and thereby reducing the liability of unnecessary side motion which might disturb the delicacy of the cut pressure.

On the other hand, in the preferred construction shown in Figures 1 to 23 inclusive, both of the hand members 84 and 93 are automatically and simultaneously reciprocated laterally with the rocking movement of the cutter supporting spindle 61 so that the hand engaging both members during the cutting pressure maintains substantially the same relation to both members, thereby increasing the steadiness of the operation of the pressure arm 84 and at the same time simplifying the connections between the spindle 61 and pressure arm 84 by reducing the number of parts.

In both the preferred and modified forms of my invention, the angular adjustment of the cutter arm 65 and its spindle 67 about the axis of the spindle 63 will be automatically regulated to take care of the variations in the surface of the glass during the process of the cutting. That is, if the lens to be cut has a cylindrical or toric surface, the curvature at the cut will change even though the lens is round and if the lens to be cut is not round, as for example, oval, the angle of the cutter spindle will automatically change as the cut approaches nearer the center of the lens, it being understood that the nearer the cut is to the center of the lens the more nearly vertical will the spindle have to be in order to be normal to the surface.

It will be seen from the foregoing description that applicant has provided a positively controlled angular adjustment of the cutter which depends upon the position of the cutting point vertically with respect to the contact surface of the upper central clamping member, not only at the start of the cut but at every position during the cut which is believed to be entirely new in this art.

It will also be observed that the cutting motion is obtained by the interaction of the various members of the cutter head assembly about four (4) axes; first, about the vertical axis of the spindle 61; second, about the horizontal axis of the spindle 59; third, about the axis of the spindle 63, at right angles to the spindle 59; and fourth, about the axis of the cutter spindle 68, thus accomplishing in a very simple manner the necessary movements of the cutter for not only cutting the lens but also for maintaining the cutter normal to the portion of the surface operated upon regardless of the thickness of the lens or contour of the surface.

Another important feature of the invention is that the angular adjustment of the spindle is governed by the distance vertically above or below the center of the lens on its top surface or the bottom face of the upper clamping member, or in other words, the vertical distance between the horizontal plane of the upper surface of the lens to be engaged by the cutter and the horizonal plane of the center of the lens adapted to be engaged by the upper clamping member, the construction for effecting this operation being believed to be entirely new in this art.

What I claim is:

1. In a cutting machine of the character described, a work table rotatable about a vertical axis, a work-supporting diaphragm on the upper face of the table and having its central portion flexible vertically relatively to its marginal edges, means for rotating the table, a cutting element, means for moving the cutting element into engagement with the work on the diaphragm, and means operable at will for flexing said central portion of the diaphragm upwardly into engagement with the work.

2. A cutting machine as in claim 1 in which releasable means is provided for engaging the upper face of the marginal edge of the diaphragm for clamping the same to the table.

3. A cutting machine as in claim 1 in which means is provided including a centering pin on the diaphragm for centering the diaphragm on the table.

4. In a cutting machine of the character described, a work table rotatable about a vertical axis, means for rotating the table, a cutting element, means for moving said element into engagement with the work on the table, and means brought into action by the engagement of the cutting element with the work for causing the cutting element to assume a position normal to the surface of the work engaged thereby in case it should be abnormal to said surface when brought into contact therewith.

5. In a cutting machine of the character described, a work-table rotatable about a vertical axis, means for rotating said table, a clamping element, a cutting element, means for moving said elements one in advance of the other into engagement with the work on the table, and means actuated by the relative movement of said elements after one of them has engaged the work for causing the cutting element to assume a position normal to the surface of the work engaged thereby.

6. In a cutting machine of the character described, a work-table rotatable about a vertical axis, means for rotating said table, a clamping element, a cutting element, means for moving said elements respectively in sequence into engagement with the work to cause the engagement of the clamping element in advance of the cutting element, and means actuated by the continued movement of the cutting element to its work-engaging position after the clamping element has engaged the work whereby the engagement of the cutting element with the work will cause said cutting element to assume a position normal to the surface of the work engaged thereby.

7. In a cutting machine of the character described, a work-table rotatable about a vertical axis, means for rotating said table, a cutting element movable about a vertical axis and also about a horizontal axis, and means including a leaf spring for moving the cutting element about the horizontal axis to cause the cutter to engage the work under yielding pressure, a pattern rotatable with the work table, and means actuated by the pattern for moving the cutting element about the vertical axis.

8. In a cutting machine of the character described, a work-table rotatable about a vertical axis, means for rotating said table, a cutting element, means including a hand lever for moving the cutting element into engagement with the work and adapted to continue its movement after said engagement, and means brought into action by the engagement of the cutting element with the work for causing the cutter to assume a position normal to the surface of the work engaged thereby.

9. In a cutting machine of the character described, a work-table rotatable about a vertical axis, means for rotating the table, clamping members above and below the work for holding the work on the table to rotate therewith, a hand lever, means actuated by said hand lever for moving said members one in advance of the other to their work-holding positions.

10. In a cutting machine of the character described, a work-table rotatable about a vertical axis, means for rotating the table, lower and upper rotary clamping members for holding the work on the table to rotate therewith, a cutter, means for moving the cutter into cutting engagement with the work, a hand lever and means actuated by the hand lever for sequentially moving the upper and lower clamping members respectively to their work-holding positions.

11. In a cutting machine of the character described, a work-table rotatable about a vertical axis, means for rotating the table, a rocker arm having a rotary clamping member for engaging the upper surface of the work, means including a hand lever for rocking said arm to its work-clamping position, a second rocker arm having a cutter for engaging said surface, means actuated by the first rocker-arm for moving the second rocker arm toward its cutting position, and additional means for completing the movement of the cutter arm to its cutting position.

12. A cutting machine as in claim 11 in which means is provided actuated by the continued movement of the cutter arm to its cutting position after the clamping arm has been brought to its clamping position for causing the cutter arm to assume a position normal to the surface of the work engaged thereby.

13. In a cutting machine of the character described, a frame, a rotary work table mounted on the frame, two rocker arms movable in the direction of the axis of the table and provided respectively with a rotary clamping member and a cutting member for engaging the same surface of the work, means for rocking the clamping arm to its clamping position, means actuated by the clamping arm for moving the cutter arm part way toward its cutting position, means for continuing the movement of the cutter arm to its cutting position relatively to the clamping arm, and means carried by said arms whereby their relative movement will cause the cutter arm to assume a position normal to the surface of the work engaged thereby.

14. In a cutting machine of the character described, a work table rotatable about a vertical axis, a pattern member rotatable with said table, a rock shaft parallel with the axis of rotation of the table, a cutter arm pivotally mounted on the rock shaft to rock toward and from the work table, means actuated by the pattern for operating the rock shaft, means for rocking the cutter arm to bring the cutter into engagement with the work on the table, and means brought into action by the engagement of the cutter with the surface of the work for causing said cutter to assume a position normal to said surface.

15. In a cutting machine of the character described, a frame, a rotary work table journaled on the frame, means for rotating the table, a pattern member rotatable with the table, a cutter arm movable about an axis parallel with that of the table and having an independent rocking movement about an axis at right angles to the first named axis, means for rocking the cutter arm about the second axis to bring the cutter into engagement with the work, means including a lever engaged with and actuated by the pattern about the first axis for moving the cutter arm laterally about the first axis and means including a rotarily adjustable cam for adjusting the lever angularly to vary the size of the cut lens.

16. In a cutting machine of the character described, a work table rotatable about a vertical axis, means for rotating the table, a pattern member rotating with the table, an upright shaft movable angularly about an axis parallel with that of the work table, a cutter arm pivotally mounted on said upright shaft to swing about an axis at right angles thereto toward and from the work table, means for rocking said arm toward the work table to bring the cutter into engagement with the work, a pattern-engaging lever loose on the upright shaft, a second lever secured to said upright shaft, and a cam rotarily mounted on one of said levers to engage the other lever and adjustable at will about its axis for effecting a corresponding angular adjustment of the loose lever to vary the size of the cut lens.

17. In a cutting machine of the character described, a frame, a rotary work table journaled on the frame, a shaft journaled on the frame to rock about an axis parallel with that of the work table, a cutter arm journaled on the rock shaft to rock about an axis at right angles to that of the shaft, means for rocking the cutter arm to bring the cutter into engagement with the work, a pattern rotating with the work table, a lever loosely journaled on said shaft, a second lever secured to said shaft, a cam rotarily adjustable on one of the levers and engaged with the other lever to effect relative movement of said levers for varying the size of the lens, and spring means for yieldingly holding the loose lever in engagement with the pattern.

18. In a cutting machine of the character described, a frame, a rotary work table journaled on the frame, a shaft journaled on the frame to rock about an axis parallel with that of the work table, a cutter arm journaled on the rock shaft to rock about an axis at right angles to that of the shaft, means for rocking the cutter arm to bring the cutter into engagement with the work, a crank arm loosely mounted on the upright shaft, a pattern member rotating with the work table, means for transmitting motion from the pattern to the crank arm, a second crank arm secured to the upright shaft, and means including a cam for transmitting motion from the first crank arm to the second crank arm for rocking said shaft with the cutter arm thereon, said cam being adjustable at will for rocking the shaft and cutter arm independently of the first named crank arm for varying the distance of the cutter from the axis of rotation of the work table and thereby to vary the size of the cut work.

19. In a cutting machine of the character described, a frame, a rotary work table journaled on the frame, a pattern member rotatable with the work table, means for rotating the table, a rock shaft journaled on the frame parallel with the axis of the work table, a cutter arm journaled on the rock shaft to move the cutter into and out of engagement with the work, means for rocking said arm to bring the cutter into engagement with the work, a pattern-engaging arm journaled on the rock shaft for relative rocking movement about the axis thereof, an additional arm secured to the shaft, and adjustable means for transmitting angular motion from the second arm to the third arm.

20. A cutting machine as in claim 19 in which yielding means is provided for maintaining operative relation between the second arm and the third arm.

21. A cutting machine as in claim 19 in which yielding means is provided for maintaining operative relation between the second arm and the third arm, said means including a spring and a lever for varying the tension of the spring.

22. In a cutting machine of the character described, a frame, a work table journaled on the frame to rotate about a vertical axis, means for rotating the work table, a rock arm movable about a horizontal axis toward and from the work table, a spindle carried by said arm and adapted to move angularly about its axis, and a cutter mounted on the spindle in offset relation to its axis.

23. In a cutting machine of the character described, a frame, a work table journaled on the frame to rotate about a vertical axis, means for rotating the work table, a rock arm movable about a horizontal axis toward and from the work table, a spindle carried by said arm and adapted to move angularly about its axis, and a cutter mounted on the spindle in offset relation to its axis, and releasable means for holding the cutter on the spindle.

24. In a cutting machine of the character described, a frame, a work table journaled on the frame to rotate about a vertical axis, means for rotating the work table, a rock arm movable about a horizontal axis toward and from the work table, a spindle carried by said arm and adapted to move angularly about its axis, and a cutter mounted on the spindle in offset relation to its axis, and yielding means for limiting the angular movement of the cutter spindle.

25. In a cutting machine of the character described, a frame, a work table journaled on the frame to rotate about a vertical axis, means for rotating the table, lower and upper clamping members for holding the work on the table to rotate therewith, upper and lower rocker arms movable about parallel axes for moving said upper and lower clamping members to their clamping positions, a lever pivoted to the lower clamping arm at one side of its axis and yieldingly engaged with the upper clamping arm, means for operating said lever for moving said arms to their clamping positions one in advance of the other, a cutter supporting arm and means for moving said arm to bring the cutter into engagement with the work.

26. In a lens cutting machine of the character described, a rotary work-supporting element, a cutter supporting element, one of said elements being movable toward the other element to engage the cutter with the work, and means dependent upon the engagement of the cutter and work for causing the cutter and surface of the work engaged thereby to assume normal relation to each other.

27. In a lens cutting machine of the character described, a rotary work-supporting element, a cutter supporting element, means including a hand lever for moving one of said elements toward the other element to engage the cutter with the work, and means dependent upon the engagement of the cutter and work for causing the cutter to assume a position normal to the surface of the work engaged thereby.

28. In a lens cutting machine of the character described, a rotary work-supporting element, a cutter supporting element, one of said elements being movable toward the other element to engage the cutter with the work, and means brought into action by the engagement of the cutter and work for tilting one of the elements about the point of engagement of the cutter with the work and thereby to cause the cutter and surface of the work engaged thereby to assume a relation normal to each other.

29. In a lens cutting machine of the character described, a rotary work-supporting element, a cutter-supporting element movable about an axis to engage its cutter with the work and also movable about another axis to cause the cutter to assume a position normal to the surface of the work engaged thereby, and means brought into action by the engagement of the cutter with the work for effecting the second movement.

30. In a lens cutting machine of the character described, a work-supporting element rotatable about a vertical axis, a member movable angularly about a horizontal axis, a cutter supporting arm journaled in said member for angular movement toward and from the work-supporting element for engaging the cutter with the work, and means brought into action by the engagement of the cutter with the work for turning the arm about its axis.

31. In a lens cutting machine of the character described, a rotary work-supporting element, a rotary pattern actuated by said element, a rock-shaft movable about an axis parallel with that of the work-supporting element, a hub journaled on the rock shaft to move about an axis at right angles to the axis thereof, a cutter supporting arm mounted on said hub to rock therewith and movable angularly thereon about an axis at right angles to that of the hub, means brought into action by the engagement of the cutter with the work for effecting the angular movement of the cutter supporting arm to cause the cutter to assume a position normal to the surface of the work engaged thereby, and means actuated by the pattern for rocking said shaft.

32. In a cutting machine of the character described, a rotary work supporting element, a cutter supporting element movable toward the work supporting element, to engage the cutter with the work, yielding means operable at will for moving the cutter-supporting arm to its work-engaging position, and means brought into action through the engagement of the cutter with the work for causing the cutter to assume a position substantially normal to the surface of the work engaged thereby.

33. In a cutting machine of the character describer, a rotary work supporting element, a cutter supporting element movable toward the work supporting element to engage the cutter with the work, and means including a rack and pinion operable at will only when the cutter engages the work for causing said cutter to assume a position substantially normal to the surface of the work engaged thereby.

34. In a cutting machine of the character described a rotary work-supporting element, a cutter-supporting element, and a work clamping element both movable into sequential engagement with the work so that the engagement of the clamping element with the work precedes the engagement of the cutting element with the work, and means actuated by the continued movement of the clamping element after the cutting element has engaged the work for adjusting the cutting element to a position substantially normal to the surface of the work engaged thereby.

35. In a cutting machine of the character described, a rotary work supporting element, a cutter supporting element movable into cutting relation to the work, means brought into action through the engagement of the cutter with the work for adjusting the cutting element to a position substantially normal to the surface of the work engaged thereby, a rotary pattern rotatable with the work supporting element, and means actuated by the pattern for moving the cutter supporting element about an axis parallel with that of the work supporting element.

36. In a cutting machine of the character described, a rotary work supporting element, a work clamping element, a hand operated lever, and means including a spring for transmitting motion from the hand lever to the clamping element for bringing the latter into engagement with the work under yielding pressure, a work cutting element movable into engagement with the work, and means actuated by the clamping element when moved to its clamping position for causing the cutting element to assume a position substantially normal to the surface of the work engaged thereby.

37. In a cutting machine of the character described, a rotary work supporting element, a work clamping element movable into and out of engagement with the work, means operable at will for moving the clamping element to its clamping position under yielding pressure, a cutter supporting element movable toward the work supporting element to engage the cutter with the work, means actuated by the movement of the clamping element to its clamping position for adjusting the cutting element to a position substantially normal to the surface of the work engaged thereby, a rotary pattern actuated by the work supporting element, and means actuated by the pattern for moving the cutting element toward and from the axis of the work supporting element.

38. In a cutting machine of the character described, a rotary work supporting element, a pattern rotatable with said element, a rock shaft parallel with the axis of the work supporting element, a pattern-engaging lever loosely journaled on the shaft, means including a rotarily adjustable cam for transmitting motion from said lever to the shaft, and a cutter supporting element journaled on said shaft to rock therewith and having another rocking movement toward the work supporting element to bring its cutter into engagement with the work.

39. In a cutting machine of the character described, a rotary work supporting element, a pattern rotatable with said element, a rock shaft parallel with the axis of the work supporting element, means actuated by the pattern for rocking said shaft, a cutter supporting element journaled on said shaft to rock therewith and having another rocking movement toward the work supporting element to bring its cutter into engagement with the work, said cutter supporting element including a cutter spindle tiltable angularly relatively to the axis of the work supporting element, and means dependent upon the engagement of the cutter with the work for causing said spindle to assume a position normal to the surface of the work engaged with the cutter.

40. In a cutting machine of the character described, a rotary work-supporting table, a work-clamping element, a work-cutting element, means for moving one of said elements into engagement with the work, means for moving the other element into engagement with the work after the engagement of the first element with said work, and means brought into action through the engagement of the cutter with the work for causing the cutting element to assume a position substantially normal to the portion of the surface of the work engaged thereby.

41. In a cutting machine of the character described, a rotary work-supporting table, a work-clamping element, a work-cutting element, means for moving the clamping element into engagement with one portion of the work, means for moving the cutting element into engagement with another portion of the work after the engagement of the clamping element with said work, and means brought into action through the engagement of the cutter with the work for causing the cutting element to assume a position substantially normal to the portion of the work engaged thereby.

42. In a cutting machine of the character described, a rotary work-supporting table, a work-clamping element, a work-cutting element, means for moving the cutting element into engagement with the work, means for moving the clamping element into engagement with the work before the cutting element has engaged said work, and means actuated by the last named movement for causing the cutting element to assume a position substantially normal to the portions of the work engaged thereby.

43. In a cutting machine of the character described, a rotary work-supporting table, a work-clamping element and a work-cutting element, means for moving the clamping element into engagement with the work, means for moving the cutting element into engagement with the work, and rack and pinion connections between said elements whereby the last named movement will automatically adjust the cutting element to different angles relatively to the axis of the work table proportionate to the distance between the planes of engagement of said elements with the surface of the work.

44. In a cutting machine of the character described, a frame, a rotary work table mounted on the frame, two rocker arms movable in the direction of the axis of the table and provided respectively with a rotary clamping member and a cutting member for engaging the same surface of the work, means for rocking the clamping arm to its clamping position, means actuated by the clamping arm for moving the cutter arm part way toward its cutting position, means for continuing the movement of the cutter arm to its cutting position, and means actuated by said continued movement for adjusting the cutter arm to an angle relatively to the axis of the work-table proportionate to the distance between the planes of engagement of the clamping member and cutting member with the surface of the work.

45. In a cutting machine of the character described, a frame, a work table journaled on the frame to rotate about a vertical axis, means for rotating the table, lower and upper clamping members for holding the work on the table to rotate therewith, upper and lower rocker arms movable about parallel axes for moving the upper and lower clamping members to their clamping positions, a lever pivoted to the lower clamping arm at one side of its axis and yieldingly engaged with the upper clamping arm, means for operating said lever for moving said arms to their clamping positions one in advance of the other, a cutter, and means for bringing the work and cutter into contact.

46. In a machine of the character described, the combination with a rotary work-table, of opposed clamping members adapted to engage opposite faces of the work on said table, a movable member, means operable at will for moving said member, and means actuated by said member for moving both of the clamping members to their clamping positions.

47. In a machine of the character described, the combination with a rotary work-table, of opposed clamping members adapted to engage opposite faces of the work on said table, rocker-arms for moving their respective clamping members to their clamping positions, a movable connecting member for operating both of said rocker-arms, a hand lever operable at will, and means for transmitting motion from the hand lever to said connecting member.

48. In a machine of the character described, the combination with a rotary work-table, a rocker-arm movable toward and from the work on the table, a cutter supporting arm journaled on the rocker-arm, a cutter on said arm, means for moving the rocker arm toward the work, and means actuated by the movement of said rocker-arm toward the work and the engagement of the cutter with the work for tilting the cutter-supporting arm about its axis.

49. In a cutting machine of the character described, the combination with a rotary work-table and operating means therefor, of a pivoted work-clamping arm, a pivoted work-cutting arm, means for moving the first arm to its clamping position, means actuated by the first arm for moving the second arm toward its cutting position, and means for urging the second arm to its cutting position.

50. In a cutting machine of the character described, the combination with a rotary work-table and operating means therefor, of opposed clamping members for engaging opposite faces of the work, an operating member movable at will, and means actuated by said operating member for moving both of said clamping members to their work-clamping positions.

WILLIAM A. LOCKHART